(12) United States Patent
Hill et al.

(10) Patent No.: US 11,694,828 B2
(45) Date of Patent: *Jul. 4, 2023

(54) ELECTRICAL STEEL PROCESSING WITHOUT A POST COLD-ROLLING INTERMEDIATE ANNEAL

(71) Applicant: NUCOR CORPORATION, Charlotte, NC (US)

(72) Inventors: Theodore E. Hill, Pickerington, OH (US); Eric E. Gallo, Brownsburg, IN (US)

(73) Assignee: NUCOR CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/544,141

(22) Filed: Dec. 7, 2021

(65) Prior Publication Data

US 2022/0090220 A1 Mar. 24, 2022

Related U.S. Application Data

(63) Continuation of application No. 16/362,332, filed on Mar. 22, 2019, now Pat. No. 11,220,720, which is a
(Continued)

(51) Int. Cl.
*C21D 8/02* (2006.01)
*C21D 6/00* (2006.01)
(Continued)

(52) U.S. Cl.
CPC ....... *H01F 1/14775* (2013.01); *C21D 8/0226* (2013.01); *C21D 8/0236* (2013.01);
(Continued)

(58) Field of Classification Search
None
See application file for complete search history.

(56) References Cited

U.S. PATENT DOCUMENTS

| | | |
|---|---|---|
| 3,867,211 A | 2/1975 | Easton |
| 4,204,890 A | 5/1980 | Irie et al. |

(Continued)

OTHER PUBLICATIONS

Office Action dated Dec. 14, 2020 for Mexican Patent Application No. MX/a/2015/009265.
(Continued)

*Primary Examiner* — Anthony M Liang
(74) *Attorney, Agent, or Firm* — Moore & Van Allen PLLC; Jeffrey R. Gray

(57) ABSTRACT

Embodiments of the present invention comprise; annealing steel sheets (e.g., hot rolled steel sheets or thin cast strip steel); cold rolling the sheets in one or more cold rolling steps (e.g., with annealing steps between multiple cold rolling steps); and performing one or more of tension leveling, a rough rolling, or a coating process on the sheets after cold rolling, without an intermediate annealing step between the final cold rolling step and the tension leveling, the rough rolling, or the coating process, or the customer stamping or final customer annealing. In order to achieve the desired properties for the steel sheet, stamping and final annealing is performed by the customer. The new process provides an electrical steel with the similar, same, or better magnetic properties than an electrical steel manufactured using the traditional processing that utilizes an intermediate annealing step after cold rolling and before the stamping and final annealing.

16 Claims, 5 Drawing Sheets

Related U.S. Application Data continuation of application No. 14/797,843, filed on Jul. 13, 2015, now abandoned, which is a continuation-in-part of application No. 14/334,239, filed on Jul. 17, 2014, now abandoned, which is a continuation-in-part of application No. 13/739,184, filed on Jan. 11, 2013, now Pat. No. 10,240,220.

(60) Provisional application No. 61/586,010, filed on Jan. 12, 2012.

(51) Int. Cl.
*C21D 9/46* (2006.01)
*H01F 1/147* (2006.01)
*C22C 38/06* (2006.01)
*C22C 38/04* (2006.01)
*C22C 38/00* (2006.01)
*C22C 38/60* (2006.01)
*C22C 38/02* (2006.01)
*C21D 8/12* (2006.01)
*H01F 1/16* (2006.01)

(52) U.S. Cl.
CPC ............ *C21D 8/1266* (2013.01); *C21D 9/46* (2013.01); *C22C 38/004* (2013.01); *C22C 38/02* (2013.01); *C22C 38/04* (2013.01); *C22C 38/06* (2013.01); *C22C 38/60* (2013.01); *C21D 6/008* (2013.01); *C21D 8/1222* (2013.01); *C21D 8/1233* (2013.01); *C21D 8/1261* (2013.01); *C21D 8/1272* (2013.01); *H01F 1/16* (2013.01); *Y02P 10/20* (2015.11)

(56) References Cited

U.S. PATENT DOCUMENTS

| | | |
|---|---|---|
| 4,421,574 A | 12/1983 | Lyudkovsky |
| 4,548,655 A | 10/1985 | Miller |
| 5,009,726 A | 4/1991 | Nishimoto et al. |
| 5,084,112 A | 1/1992 | Tachino et al. |
| 5,482,107 A | 1/1996 | Judd |
| 5,609,696 A | 3/1997 | Lauer et al. |
| 5,609,969 A | 3/1997 | Clatanoff et al. |
| 5,798,001 A | 8/1998 | Anderson |
| 5,955,201 A | 9/1999 | Loudermilk et al. |
| 6,007,642 A | 12/1999 | Gallo |
| 6,231,685 B1 | 5/2001 | Anderson |
| 6,562,473 B1 | 5/2003 | Okabe et al. |
| 7,011,139 B2 | 3/2006 | Schoen et al. |
| 10,240,220 B2 * | 3/2019 | Hill .................. C21D 6/008 |
| 11,220,720 B2 * | 1/2022 | Hill .................. C22C 38/06 |
| 2006/0185767 A1 | 8/2006 | Arita et al. |
| 2007/0062611 A1 | 3/2007 | Murakami |
| 2009/0202383 A1 | 8/2009 | Tanaka et al. |

OTHER PUBLICATIONS

Office Action dated May 12, 2020 for Brazilian Patent Application No. 1120140172641.

International Search Report and Written Opinion for International Application No. PCT/US13/21140 dated Mar. 19, 2013.

International Preliminary Report on Patentability for International Application No. PCT/US13/21140 completed on Dec. 3, 2013.

Zander Voort, George F. (2004). "Microstructure and Domain Imaging of Magnetic Materials"; ASM Handbook, vol. 09—Metallography and Microstructures—63.2.1 Electrical Steels. ASM International, (Year: 2004).

1st Substantive Examination Requirement for Mexican Patent No. MX/a/2014/008493 dated Jul. 22, 2019.

Antonov, S. P., et al. "Surface Roughness of Cold-Rolled Electrical Steel." Translated from Metallurg, No. 7, Jul. 1973, pp. 515-518. (Year: 1973).

\* cited by examiner

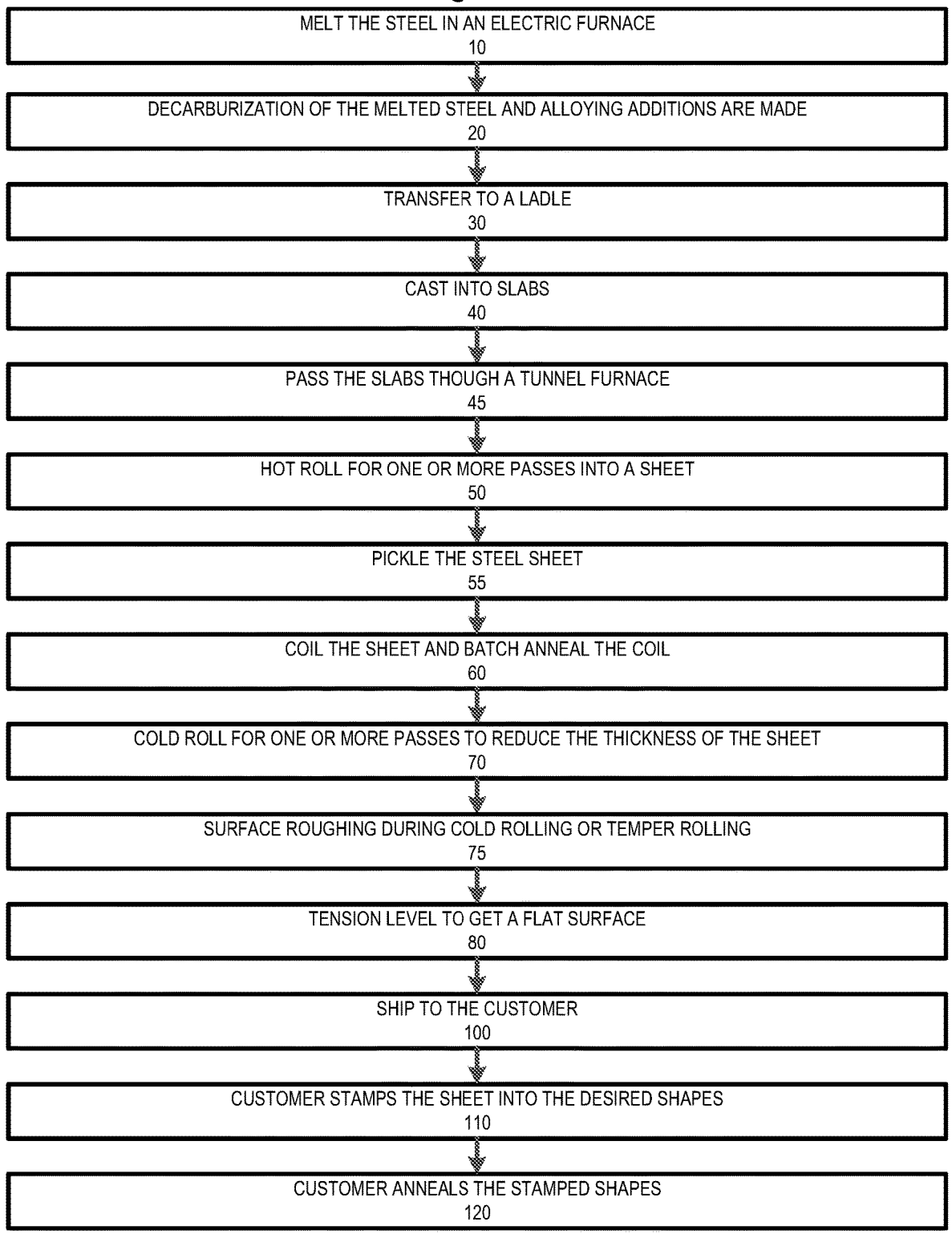

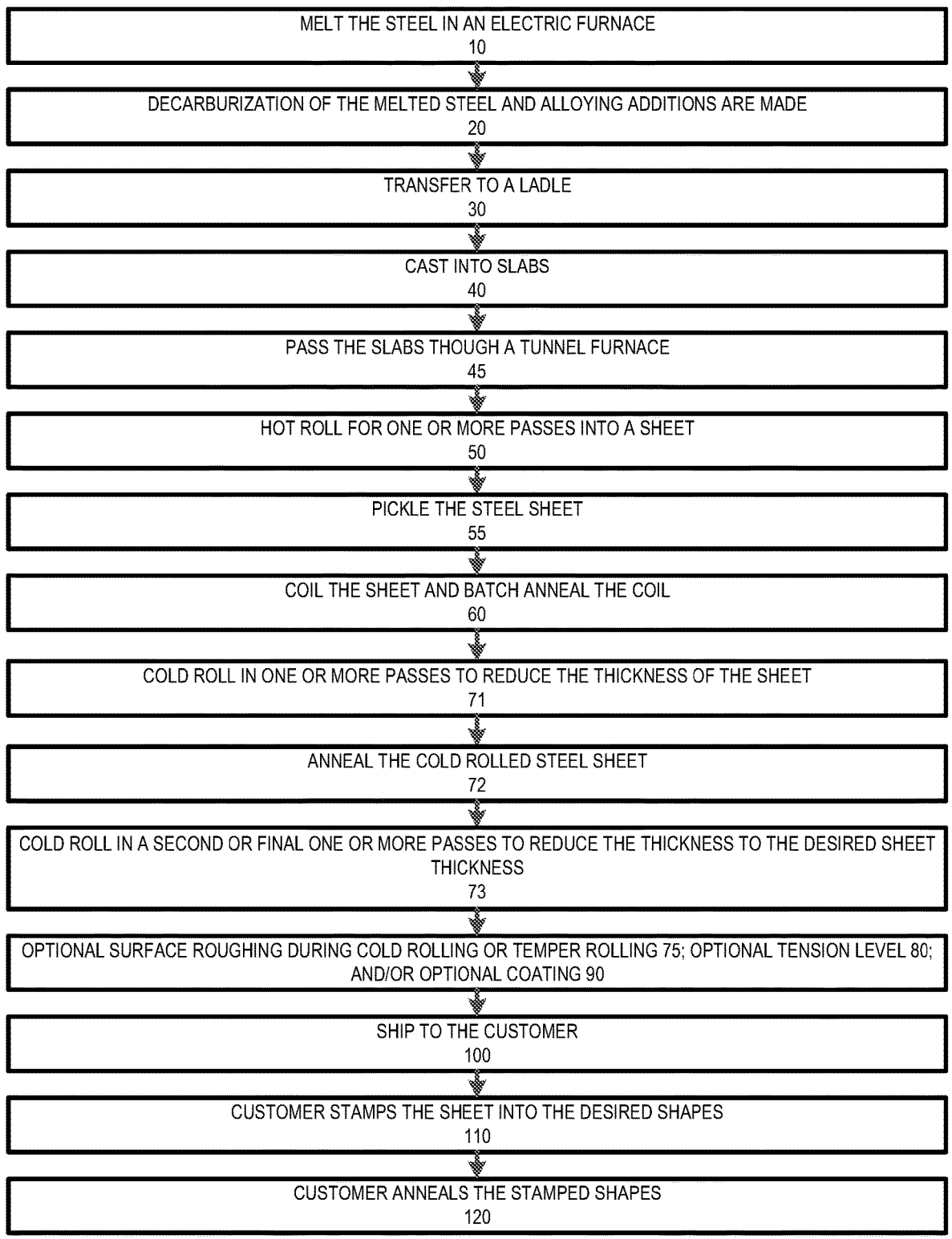

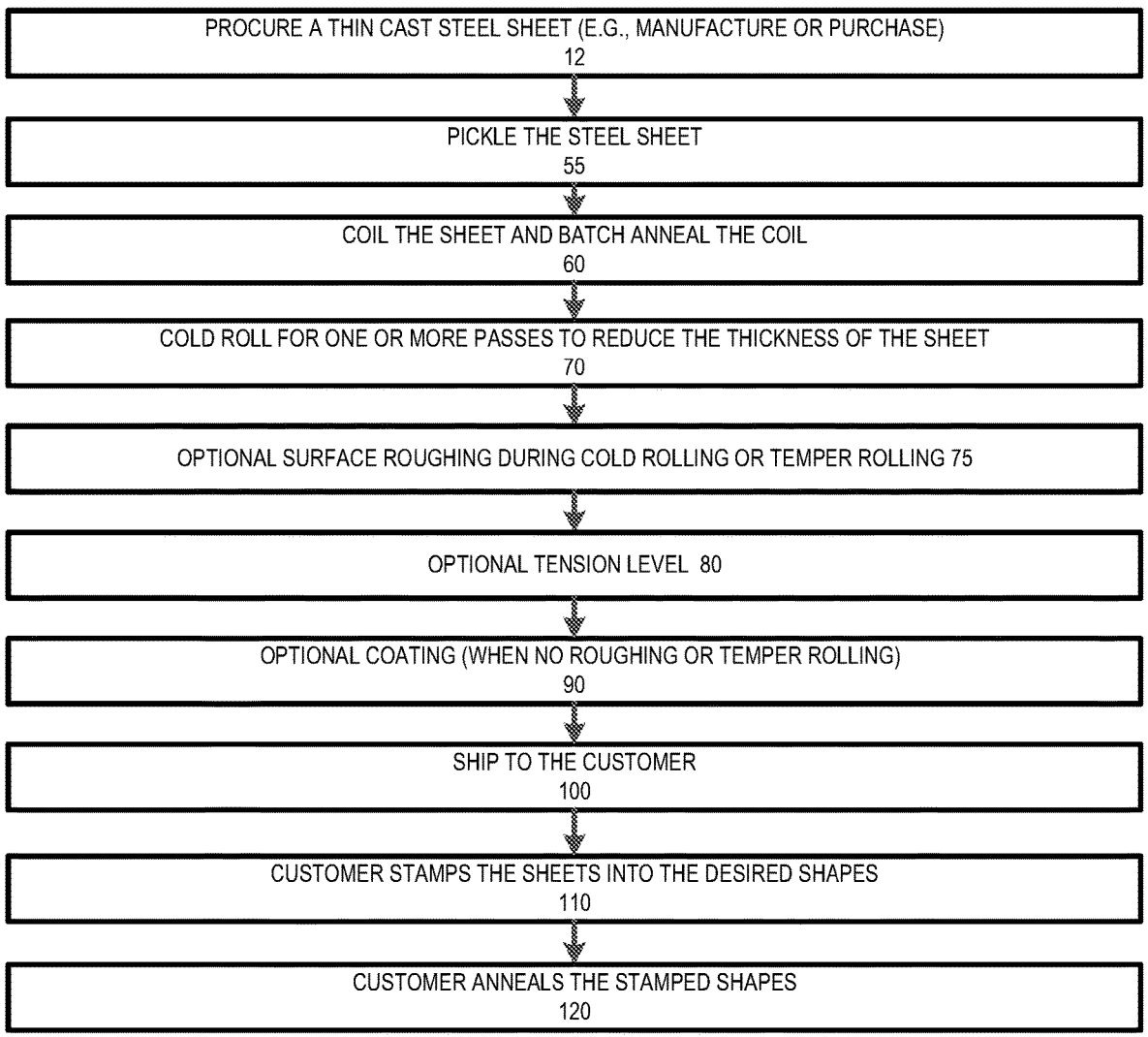

ELECTRICAL STEEL PROCESSING WITHOUT A POST COLD-ROLLING INTERMEDIATE ANNEAL

RELATED APPLICATIONS AND PRIORITY CLAIM

This application is a continuation of, and claims priority to U.S. patent application Ser. No. 16/362,332 entitled "Electrical Steel Processing Without A Post-Cold Rolling Intermediate Anneal," filed on Mar. 22, 2019, and issued into U.S. Pat. No. 11,220,720 on Jan. 11, 2022, which is a continuation of U.S. patent application Ser. No. 14/797,843 filed on Jul. 13, 2015, which is a continuation-in-part of U.S. patent application Ser. No. 14/334,239 filed on Jul. 17, 2014, which is a continuation-in-part of patented U.S. patent application Ser. No. 13/739,184 filed on Jan. 11, 2013 and issued into U.S. Pat. No. 10,240,220 on Mar. 26, 2019, which claims priority to U.S. Provisional Application No. 61/586,010 filed Jan. 12, 2012, all of which are assigned to the assignee hereof and hereby expressly incorporated by reference herein.

BACKGROUND

This invention relates generally to the field of semi-processed electrical steel sheet manufacturing, and more particularly embodiments of the invention relate to achieving electrical steel sheet products with the desired final magnetic properties after they have been annealed at the customer. Semi-processed electrical steel sheets are different from fully processed electrical steel sheets in that the semi-processed electrical steel sheets manufactured at a steel facility require an additional customer annealing step performed by the customer before the material can be used. Fully processed electrical steel sheets, on the other hand, do not require an additional customer annealing step, and thus, can be used by the customer without further annealing.

BRIEF SUMMARY

The present invention relates to manufacturing semi-processed electrical steel sheets, formed by systems using methods of manufacturing without the need for annealing after final cold rolling by the electrical steel sheet manufacturer, and before the customer annealing step. The customer annealing step described herein may also be referred to a "final anneal."

In various applications, such as electrical motors, lighting ballasts, electrical generators, etc., it may be desirable to use electrical steel products that have high saturation, high permeability, and low core loss properties. Moreover, for electrical motors that operate at high frequencies, such as for electrical motors in cars or aircraft, the electrical steel sheets often have thickness less than 0.015 inches (e.g., between 0.011 to 0.013 inches, 0.007 to 0.010 inches, or the like). For electrical steels, there comes a point in production that improving one or more of the high saturation, high permeability, and low core loss properties becomes a detriment to one or more of these properties, or other properties.

The saturation of the electrical steel is an indication of the highest induction that the steel can achieve. The permeability of the electrical steel is the measure of the ability of the steel to support the formation of a magnetic field within itself and is expressed as the ratio of the magnetic flux to the field of strength. Electrical steel with high permeability allows for an increased induction for a given magnetic field, and thus, with respect to motor applications, reduces the need for copper windings, which results in lower copper costs. The core loss is the energy wasted in the electrical steel. Low core loss in electrical steels results in a higher efficiency in the end products, such as motors, generators, ballasts, and the like. Therefore, it may be desirable in many products to use electrical steels with a high ability to support a magnetic field and a high efficiency (e.g., high permeability and low core loss) if it is not detrimental to the cost of manufacturing or other desirable steel properties.

Electrical steel is processed with specific compositions, using specific systems, and using specific methods in order to achieve electrical steels with the desired saturation, permeability, and core loss, as well as other properties. Improving one property may come at the detriment of another. For example, when increasing the permeability a higher core loss may result (and vice versa). Consequently, electrical steels are processed with specific compositions using specific methods in order to optimize the desired magnetic properties.

Electrical steel sheets are typically produced by melting scrap steel or iron in an electric furnace (e.g. through compact strip production (CSP) when steel is fed directly into the tunnel furnace, or through another process in which the steel is cast and reheated at a later point in time), or processing molten steel from iron ore in a blast furnace, described as integrated production. In the integrated process molten steel is produced in a blast furnace, and in the CSP process the molten steel is produced using an electric furnace (e.g., electric arc furnace, or other like furnace). A decarburizer (e.g., vacuum degasser, argon decarburizer, etc.) is used to create a vacuum, or change the pressure, in order to utilize oxygen to remove the carbon from the molten metal. Thereafter, the molten steel that is at least substantially free of oxygen is sent to a ladle metallurgy facility to add the alloying materials to the steel in order to create the desired steel composition. The steel is then poured into ladles and cast into slabs. The steel slabs are hot rolled (e.g., in one or more stages), annealed, cold rolled (e.g., in one or more stages), and intermediately annealed. Thereafter, the steel sheets are sent to the customer for stamping, and customer annealing in the case of semi-processed steels. These steps occur under various conditions to produce electrical steel sheets with the desired magnetic properties and physical properties (e.g., thickness, surface finish, etc.). Other steps may also be performed in order to achieve the desired magnetic properties.

During the hot rolling step (or between multiple hot rolling steps the electrical steel sheet may be maintained at a temperature above the recrystallization temperature, which is a temperature at which deformed grains are replaced by a new set of undeformed grains. Recrystallization is usually accompanied by a reduction in the strength and hardness of a material and a simultaneous increase in the ductility. The hot rolling process reduces the thickness of the steel sheet and controls the grain structure of the electrical steel. After the hot rolling stage(s) the steel is potentially pickled in a bath (e.g., sulfuric, nitric, hydrochloric, other acids, or combinations of these, etc.) in order to remove scale on the surface of the steel from oxidation. Thereafter, the electrical steel sheet is annealed to change the magnetic properties of the steel. During annealing the steel is heated, and thereafter cooled, to coarsen the structure of the steel, and improve cold working properties. The electrical steel sheet is then cold rolled after annealing, which comprises rolling the electrical steel sheet below the recrystallization temperature. Cold rolling may begin at room temperatures; however, the temperature of the steel sheet may be elevated at the beginning of the cold rolling process, or otherwise rise during cold rolling due to the cold rolling process itself. The cold rolling process increases the strength of the steel, improves the surface finish, and rolls the steel sheet to the desired thickness.

Electrical steel sheets undergoing traditional processing are annealed directly after the cold rolling process in order to recrystallize the steel and achieve the desired permeability and core loss for the electrical steel in the finished product. The annealing process, both before and after cold rolling, can be done via a continuous annealing process or a batch annealing process. In continuous annealing the sheets of steel are passed through a heating furnace and thereafter cooled in a continuous sheet. In batch annealing the steel sheets are coiled into rolls and are heated and cooled in batches of coiled rolls.

Temper rolling, in the case of semi-processed steels, may be performed after annealing in order to improve the surface finish of the electrical steel sheet, enhance the stamping characteristics, and provide improved magnetic properties after the customer has stamped (e.g., punched, or the like) the electrical steel sheet and performed a final customer annealing step (e.g., heating the stamped part).

After temper rolling, in the case of semi-processed steels produced using batch annealing, or after continuous annealing of the semi-processed steels, the electrical steel sheet is sent to the customer for further processing. The customer typically stamps the electrical steel sheet into the required shapes, and thereafter, further anneals the stamped shapes in a customer annealing process. The customer anneal is performed by heating the stamped shapes to a specific temperature and letting them cool in order to maximize the magnetic properties of the stamped electrical steel part. The annealing process after stamping is performed by the customer because after stamping the stamped shapes have cold-worked edges and the customer annealing process removes the cold-worked edges, relieves any stress caused by stamping, and maximizes the final magnetic properties of the stamped part. Therefore, in traditional semi-processed electrical steel manufacturing there are three annealing steps, a pre-anneal before cold rolling, a post cold rolling intermediate anneal, and a final anneal at the customer. In still other embodiments of the invention annealing steps may also occur between the individual stages of multiple hot rolling or cold rolling passes.

The present invention provides methods and systems that can be used to produce electrical steels with compositions that provide the same, similar, and/or better magnetic properties (e.g., saturation, permeability, and core loss) than steels that are produced using traditional electrical steel processing that utilizes an intermediate annealing step after the final cold rolling pass and before additional steel processing, or customer stamping and annealing.

In the present invention, as is the case with traditional electrical steel processing, scrap steel and/or iron is melted into molten steel or molten steel is produced from iron ore; the molten steel is sent for decarburization and for alloy additions; the steel is poured into ladles and cast into slabs (or continuously cast in some embodiments described later); and the slabs are hot rolled, pickled, annealed (e.g., batch annealed or continuously annealed), and cold rolled into sheets. However, unlike traditional electrical steel processing, in the present invention, the intermediate annealing step (e.g., the batch annealing step, or alternatively, the continuous annealing step) after cold rolling is not performed. Instead, in the present invention, after cold rolling a tension leveling step may be performed or a coating may be applied to the semi-processed electrical steel sheet before it is sent to the customer. At the customer locations, as is the case with the traditional method for manufacturing semi-processed electrical steels, the customers stamp the electrical steel sheets into the desired shapes, and thereafter, perform a customer annealing step to remove distortions created by the stamping and to maximize the magnetic properties of the electrical steel.

One embodiment of the invention comprises a method of manufacturing an electrical steel. The method comprises hot rolling steel into a steel sheet in one or more hot rolling passes to a post hot rolling thickness of less than 0.1 inches; annealing the steel sheet in a first anneal after hot rolling; cold rolling the steel sheet in one or more first cold rolling passes after the first anneal to a post first cold rolling thickness less than 0.05 inches; annealing the steel sheet in a second anneal after the one or more first cold rolling passes; cold rolling the steel sheet in one or more final cold rolling passes after the second annealing process to a thickness of less than 0.015 inches; and whereby final magnetic properties are achieved in the steel sheet after the steel sheet is stamped and final annealed without an intermediate annealing process after the one or more final cold rolling passes, and before the stamping and the final annealing.

In further accord with an embodiment of the invention, the method comprises manufacturing electrical steel with a composition of silicon (Si) in a range of 0.15-3.5% weight; manganese (Mn) in a range of 0.005-1% weight; aluminum (Al) less than or equal to 1% weight; carbon (C) less than or equal to 0.04% weight; antimony (Sb) or tin (Sn) less than or equal to 0.1% weight; and wherein the remainder comprises unavoidable impurities and iron.

In another embodiment of the invention, the method comprises manufacturing electrical steel with a composition of silicon (Si) is in the range of 2.8-3.5% weight; manganese (Mn) in a range of 0.2-0.4% weight; and aluminum (Al) in a range of 0.5-0.75% weight.

In still another embodiment of the invention, the method further comprises sending the steel sheet to a customer for the stamping and the final annealing after the stamping.

In yet another embodiment of the method, the first anneal comprises a batch anneal above 1600 degrees F., and the second anneal comprises a batch anneal above 1500 degrees F.

In further accord with an embodiment of the method, the final thickness of the steel sheet is 0.011 to 0.013 and the final magnetic properties comprise a permeability of greater than 7500 G/Oe and a core loss of less than 16.0 w/kg when tested at 1.0 T at 400 Hz.

In another embodiment of the method, the final thickness of the steel sheet is 0.007 to 0.010 and the final magnetic properties comprise a permeability greater than 8500 G/Oe and a core loss less than 13.0 w/kg when tested at 1.0 T at 400 Hz.

Another embodiment of the invention comprises a method of manufacturing an electrical steel. The method comprises procuring a thin strip cast steel, wherein the thickness of the thin strip cast steel is less than or equal to 0.05 inches; annealing the thin strip cast steel; cold rolling the steel sheet in one or more cold rolling passes after annealing to a thickness of less than 0.015 inches; and whereby final magnetic properties are achieved in the steel sheet after the steel sheet is stamped and final annealed without an intermediate annealing process after the one or more cold rolling passes, and before the stamping and the final annealing.

In further accord with an embodiment of the invention, the method comprises manufacturing electrical steel with a composition comprising silicon (Si) in a range of 0.15-3.5% weight; manganese (Mn) in a range of 0.005-1% weight; aluminum (Al) less than or equal to 1% weight; carbon (C) less than or equal to 0.04% weight; antimony (Sb) or tin (Sn) less than or equal to 0.1% weight; and wherein the remainder comprises unavoidable impurities and iron.

In another embodiment of the invention, the method comprises manufacturing electrical steel with a composition comprising silicon (Si) is in the range of 2.8-3.5% weight; manganese (Mn) in a range of 0.2-0.4% weight; and aluminum (Al) in a range of 0.5-0.75% weight.

In still another embodiment, the method further comprises sending the steel sheet to a customer for the stamping and the final annealing after the stamping.

In yet another embodiment of the method, the annealing comprises a batch anneal above 1500 degrees F.

In further accord with an embodiment of the method, the thickness of the steel sheet is 0.011 to 0.013 and the final magnetic properties comprise a permeability of greater than 7500 G/Oe and a core loss of less than 16.0 w/kg when tested at 1.0 T at 400 Hz.

In another embodiment of the method, the thickness of the steel sheet is 0.007 to 0.010 and the final magnetic properties comprise a permeability greater than 8500 G/Oe and a core loss less than 13.0 w/kg when tested at 1.0 T @ 400 Hz.

Another embodiment of the invention is an electrical steel, comprising silicon (Si) in a range of 0.15-3.5% weight and the remainder comprises unavoidable impurities and iron. The electrical steel is produced by hot rolling steel in one or more hot rolling passes into a steel sheet to a post hot rolling thickness of less than 0.1 inches; annealing the steel sheet in a first anneal after hot rolling; cold rolling the steel sheet in one or more first cold rolling passes after the first anneal to a thickness less than 0.05 inches; annealing the steel sheet in a second anneal after the one or more first cold rolling passes; cold rolling the steel sheet in one or more final cold rolling passes after the second annealing process to a thickness of less than 0.015 inches; and whereby final magnetic properties are achieved in the steel sheet after the steel sheet is stamped and final annealed without an intermediate annealing process after the one or more final cold rolling passes, and before the stamping and the final annealing.

In further accord with an embodiment of the invention, the electrical steel further comprises manganese (Mn) in a range of 0.005-1% weight; aluminum (Al) less than or equal to 1% weight; carbon (C) less than or equal to 0.04% weight; and antimony (Sb) or tin (Sn) less than or equal to 0.1% weight.

In another embodiment of the invention, the electrical steel comprises silicon (Si) is in the range of 2.8-3.5% weight; manganese (Mn) in a range of 0.2-0.4% weight; and aluminum (Al) in a range of 0.5-0.75% weight.

In still another embodiment of the invention, the electrical steel is further produced by sending the steel sheet to a customer for the stamping and the final annealing after the stamping.

In yet another embodiment of the invention, the first anneal comprises a batch anneal above 1600 degrees F., and the second anneal comprises a batch anneal above 1500 degrees F.

In further accord with an embodiment of the invention, the final thickness of the steel sheet is 0.011 to 0.013 and the final magnetic properties comprise a permeability of greater than 7500 G/Oe and a core loss of less than 16.0 w/kg when tested at 400 Hz at 1.0 T.

In another embodiment of the invention, the final thickness of the steel sheet is 0.007 to 0.010 and the final magnetic properties comprise a permeability greater than 8500 G/Oe and a core loss less than 13.0 w/kg.

Another embodiment of the invention is an electrical steel comprising silicon (Si) in a range of 0.15-3.5% weight and the remainder of the composition of the electrical steel comprises unavoidable impurities and iron. The electrical steel is produced by procuring a thin strip cast steel, wherein the thickness of the thin strip cast steel is less than or equal to 0.05 inches; annealing the thin strip cast steel; cold rolling the thin strip cast steel in one or more cold rolling passes after the annealing into a steel sheet with a thickness less than 0.015 inches; and whereby final magnetic properties are achieved in the steel sheet after the steel sheet is stamped and final annealed without an intermediate annealing process after the one or more cold rolling passes, and before the stamping and the final annealing.

In further accord with an embodiment of the invention, the electrical steel further comprises manganese (Mn) in a range of 0.005-1% weight; aluminum (Al) less than or equal to 1% weight; carbon (C) less than or equal to 0.04% weight; and antimony (Sb) or tin (Sn) less than or equal to 0.1% weight.

In another embodiment of the invention, the composition of the electrical steel comprises silicon (Si) is in the range of 2.8-3.5% weight; manganese (Mn) in a range of 0.2-0.4% weight; and aluminum (Al) in a range of 0.5-0.75% weight.

In still another embodiment of the invention, wherein the electrical steel is further produced by sending the steel sheet to a customer for the stamping and the final annealing after the stamping.

In yet another embodiment of the invention, annealing the thin strip cast steel comprises a batch anneal above 1500 degrees F.

In further accord with an embodiment of the invention, the final thickness of the steel sheet is 0.011 to 0.013 and the final magnetic properties comprise a permeability of greater than 7500 G/Oe and a core loss of less than 16.0 w/kg when tested at 1.0 T at 400 Hz.

In another embodiment of the invention, the final thickness of the steel sheet is 0.007 to 0.010 and the final magnetic properties comprise a permeability greater than 8500 G/Oe and a core loss less than 13.0 w/kg when tested at 1.0 T at 400 Hz.

To the accomplishment of the foregoing and the related ends, the one or more embodiments comprise the features hereinafter fully described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE SEVERAL VIEWS OF THE DRAWINGS

Figure 1A:
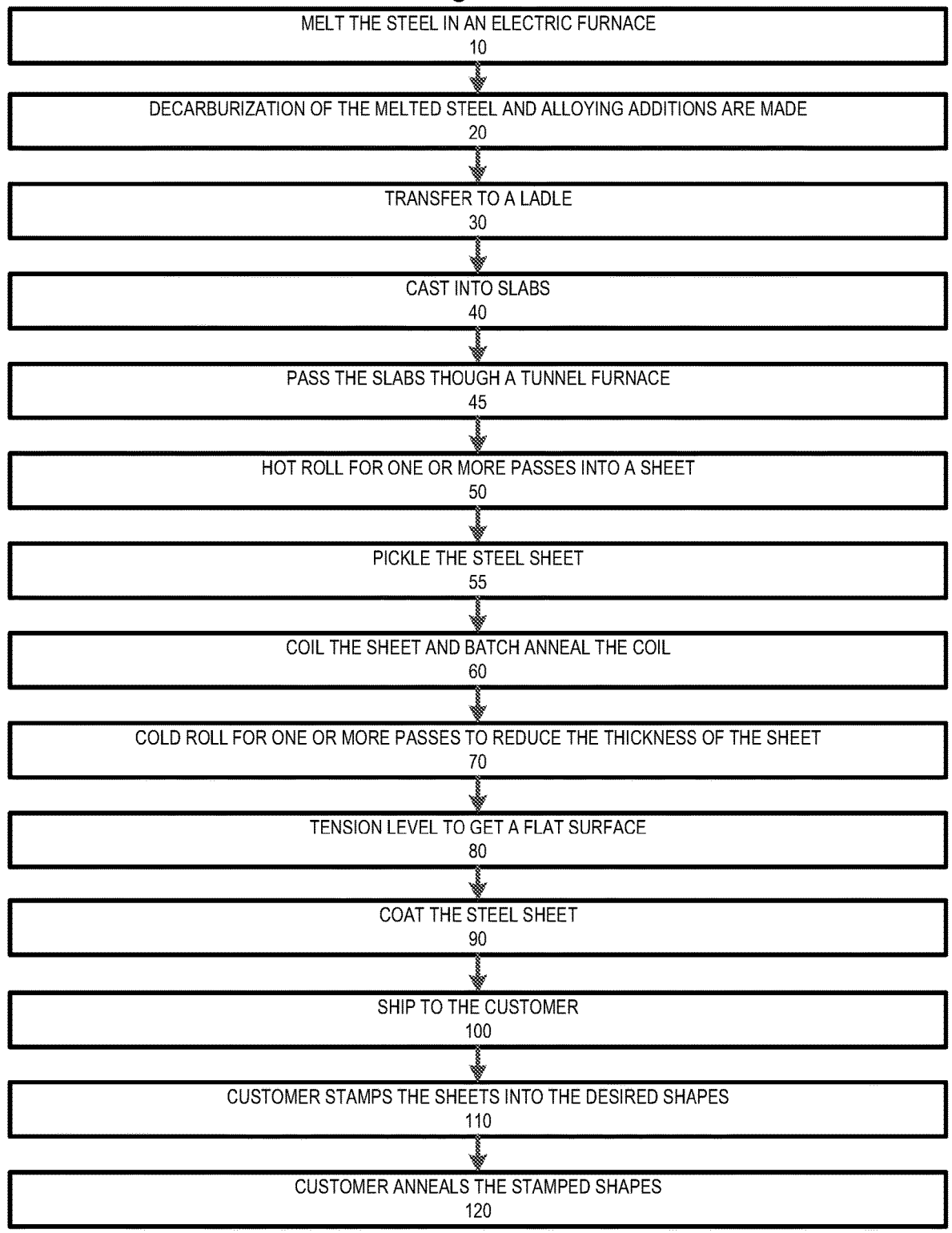
Figure 2:
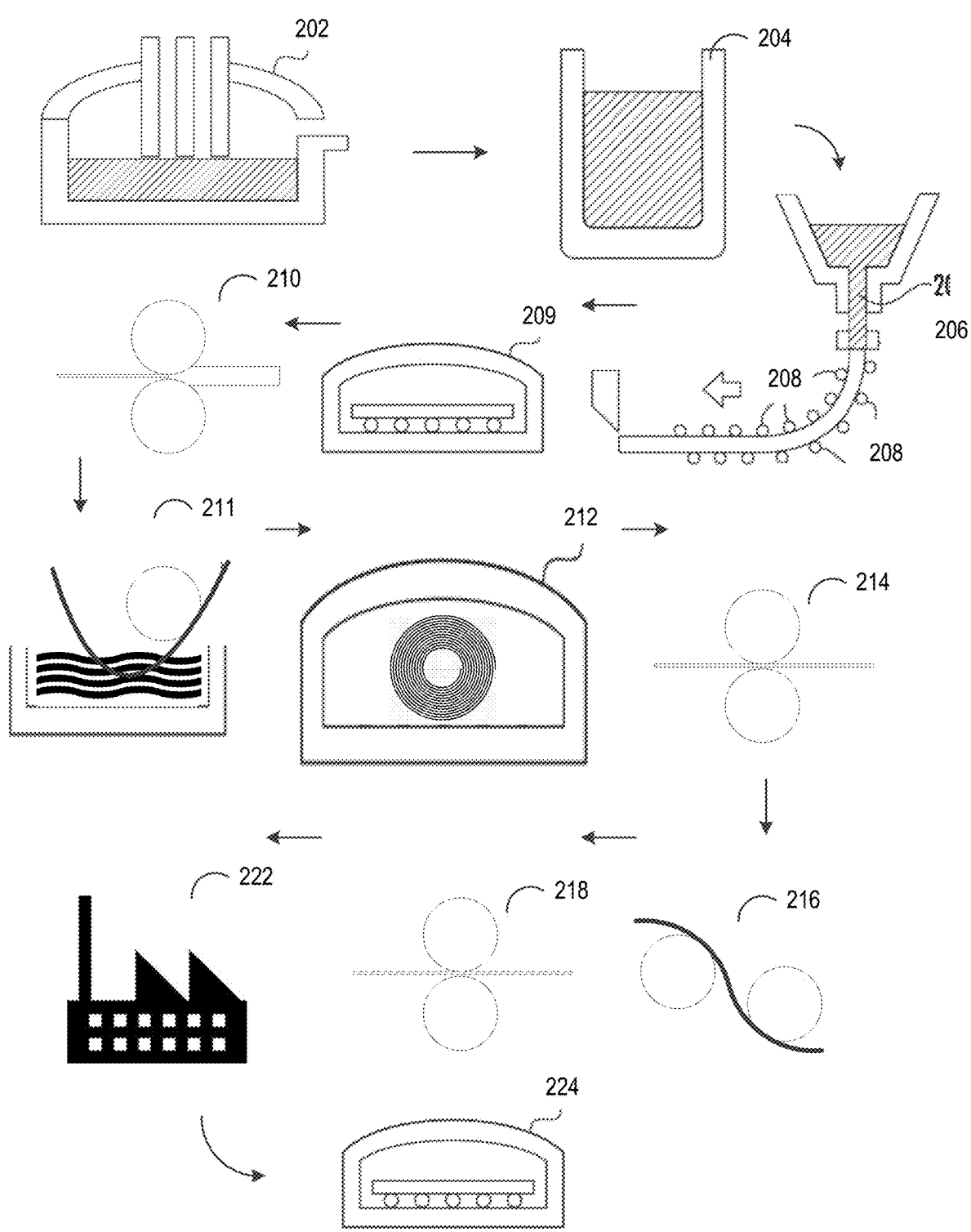

Having thus described embodiments of the invention in general terms, reference will now be made to the accompanying drawings, wherein:

FIG. 1A provides a process flow for producing electrical steel, in accordance with one embodiment of the invention;

FIG. 1B provides a process flow for producing electrical steel, in accordance with one embodiment of the invention;

FIG. 2 provides an electrical steel processing system environment in accordance with one embodiment of the invention;

FIG. 3 provides a process flow for producing electrical steels with lower thicknesses using multiple cold rolling steps with intermediate annealing and without annealing after the final cold rolling step; and FIG. 4 provides a process flow for producing electrical steels with lower thicknesses using thin strip cast steel.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Furthermore, the ranges discussed herein are inclusive ranges.

FIGS. 1A and 1B illustrate flow charts for electrical steel production processes 1, 2 for manufacturing electrical steels with desirable magnetic properties (e.g., high saturation, high permeability, and low core loss) without the need for an annealing step (e.g., continuous annealing or batch annealing) directly after cold rolling (e.g., the final cold rolling pass). FIG. 1A illustrates an electrical steel production process 1 for manufacturing electrical steel with a tension leveling and/or coating after cold rolling, while FIG. 1B illustrates an electrical steel production process 2 for manufacturing electrical steel with a surface rouging or temper rolling, and tension leveling after cold rolling. FIG. 2 illustrates an electrical steel processing system environment 200 used in manufacturing the electrical steels in accordance with the process described in FIGS. 1A and 1B.

As illustrated by block 10 in FIGS. 1A and 1B, scrap steel or iron may be melted into molten steel in an electric arc furnace 202, as illustrated in FIG. 2. In other embodiments of the invention other types of furnaces may also be used to produce molten steel from scrap steel. In other embodiments of the invention, molten steel may alternatively be produced from iron ore. As illustrated by block 20 in FIGS. 1A and 1B, the molten steel may be decarburized by removing all, or substantially all, of the oxygen from the molten steel, and thereafter, alloys may be added to produce the desired composition of the electrical steel. The decarburized process step may be performed in a vacuum degasser, argon decarburizer, or other like system, while the alloying additions may be made in a ladle metallurgy facility, or other like system. Embodiments of the compositions of various electrical steels will be described in detail below.

As illustrated in block 30 of FIGS. 1A and 1B, the molten steel is transferred to a ladle 204 as illustrated in FIG. 2. Thereafter, as illustrated by block 40 in FIGS. 1A and 1B the ladle 204 supplies a tundish 206 with the molten steel and the steel is cast 208 into slabs, as illustrated in FIG. 2. After being cast, the slabs may be sent through a tunnel furnace 209 to maintain the desired temperature of the slab, as illustrated by block 45 in FIGS. 1A and 1B, as well as in FIG. 2. Upon exiting the tunnel furnace 209 the slabs may be sent directly to the rolling mill for hot rolling. In other embodiments of the invention the steel may be cast 208 into slabs, allowed to cool, and thereafter, at a later time, sent to a re-heater at the rolling mill before being hot rolled. In still other embodiments of the invention the steel may be continuously cast into a thin steel sheet and thereafter sent for further processing, as discussed later with respect to FIG. 4.

As illustrated by block 50 in FIGS. 1A and 1B, the cast slabs are hot rolled into sheets in one or more hot rolling passes through one or more sets of hot rollers 210. As illustrated by block 55, after hot rolling, the formed sheet may be pickled in order to remove scale (e.g., iron oxide) from the steel sheet. Thereafter, as illustrated by block 60 of FIGS. 1A and 1B the pickled sheet is coiled and sent for batch annealing 212 with one or more other coiled sheets as illustrated in FIG. 2. Alternatively, in some embodiments the sheets may be continuously annealed if the manufacturing facility has a continuous annealing line. As illustrated by block 70 in FIGS. 1A and 1B, after batch annealing 212 (or continuous annealing in alternative processes) the coiled rolls are uncoiled and cold rolled into thinner sheets in one or more cold rolling passes through one or more sets of cold rolls 214, as illustrated in FIG. 2.

After cold rolling, unlike traditional electrical steel processing, the cold rolled electrical steel sheets are not processed using further annealing. The cold rolling process may produce sheets that have wavy edges or buckling throughout the sheet, such that a customer may not be able to use the sheets for end products. In traditional electrical steel processing, annealing the sheets after cold rolling removes the wavy edges and/or buckling from the sheet. However, in the present invention, since there is no annealing step directly after cold rolling (e.g., the final cold rolling pass) the sheet may need to undergo a tension leveling step as illustrated by block 80 in FIG. 1A. During tension leveling penetrating rollers 216, as illustrated in FIG. 2, transform the sheet having wavy edges and/or buckling back into a flat sheet (e.g., no wavy edges or buckling), which may be needed in order to allow a customer to properly feed the sheet through a press for the stamping process. During tension leveling the sheet is bent over and under (or vice versa) the penetrating rollers 216, as illustrated in FIG. 2. The penetrating rolls 216 deform and apply tension to the sheet in order to stretch the sheet to remove the wavy edges and/or buckling.

As illustrated by block 90 in FIG. 1A, after tension leveling a coating may be added to the electrical steel sheet. The coating may be added by running the sheet through a bath or rolling a coating onto the sheet when passing the sheet through a set of coating rolls 218, as illustrated in FIG. 2. The coating (or a rough surface as described below) may be applied to the sheet because when the customer performs an annealing step after the sheet has been stamped, the stamped shapes may stick together such that they may not be separated if the sheet does not have a coating (or a rough surface). Different types of coatings (or rough surfaces) may be applied to the electrical steel sheets depending on the needs of the customer.

In some embodiments of the invention, instead of applying a coating, the electrical steel sheets are produced with a rough surface, as illustrated in FIG. 1B. In some embodiments of the invention, the rough surface may be applied during the cold rolling process using high roughness rolls, as illustrated by block 75 in FIG. 1B. In other embodiments of the invention, instead of applying a rough surface to the electrical steel sheet during cold rolling, the electrical steel sheet may be passed through a temper rolling process (off-line or continuously) after cold rolling and before tension leveling, in order to achieve the desired rough surface, as also illustrated by block 75 in FIG. 1B. In most applications an electrical steel sheet would not be manufactured having both a rough surface and a coating, however, there may be applications where this would be desirable.

Block 100 in FIGS. 1A and 1B illustrates that after the coating is applied to the electrical steel sheet, the sheet is coiled and sent to the customer 222, as illustrated in FIG. 2. As illustrated by block 110, the customer stamps the electrical steel sheet into the desired shapes (e.g., the shapes necessary for use in motor cores, ballast lighting, electrical generators, or the like). Thereafter, the customer may perform a final customer annealing step as illustrated by block 120 in FIGS. 1A and 1B, as is customary in processing semi-processed electrical steels. During the customer annealing step the stamped shapes are heated in a heating furnace 224 to remove stresses and to maximize the final magnetic properties, as illustrated in FIG. 2.

The desired properties (e.g., saturation, permeability, and core loss) produced during the manufacturing process of the electrical steel are dependent, at least in part, on the grain size of the electrical steel, composition, and processing conditions. The grain sizes, compositions, and process conditions of the electrical steels produced using the process of the present invention, for achieving the desired magnetic properties, are described below in more detail in contrast to the traditional processes used for creating electrical steels and the associated magnetic properties obtained from the traditional processing methods. When discussing the properties of the electrical steels herein, the properties are all measured after the final customer annealing step.

In electrical steels processed using traditional manufacturing (e.g., with an annealing step after cold rolling and before the customer annealing step), the electrical steel sheets typically have a grain size in the range of 70 to 150 microns. In the present invention the grain size of electrical steels produced without performing the intermediate annealing step after cold rolling are in the range of 20 to 70 microns, and preferably around 40 microns. The smaller grain size in the present invention helps to create high permeability in the electrical steel because it is easier to magnetize smaller domain structures. Magnetic domain structures are regions within the grains that have the same magnetic orientation. The boundary (e.g., walls) of the domains move when an applied magnetic field changes size or direction. The smaller the grain size the smaller the domain structure, and thus, the easier it is to support the magnetic field. Therefore, the permeability of the magnetic structure is increased.

Alternatively, the smaller grain size may have a negative effect on the core loss, that is, the smaller the grain size the greater the hysteresis portion of core loss realized in the electrical steel. At the lower levels of grain size, such as around 20 microns, the increased core loss may not be ideal for some electrical steels depending on the products in which they are used. Therefore, reducing the grain size in the new process to 20 to 70 microns from the 70-150 microns seen in traditional processing, may greatly improve permeability with only a minor increase in core loss. The optimal grain size for electrical steel sheets in some products, such as motors, may be around 40 (e.g., 30 to 50) microns in order to achieve the desired permeability and core losses.

The grain texture may also play a role in improving the permeability and reducing the core loss. The grain texture is described as the orientation of the grains. Developing non-oriented electrical steels with improved grain texture (e.g., more oriented grains in various directions) may increase the permeability and/or reduce the core loss.

The grain size, and thus, the magnetic properties of the electrical steels can be controlled, in part, by the composition of the electrical steels. The compositions of the electrical steels used in the present invention may have the ranges disclosed in Table 1. The ranges disclosed in Table 1 illustrate examples of the percent weight of Silicon, Aluminum, Manganese, Carbon, and/or Antimony that provide the desired electrical steel sheets with high permeability and low core loss using the process of the present invention that excludes the intermediate annealing step after cold rolling and before the customer annealing step. In other embodiments of the invention smaller ranges of these elements may be more acceptable in producing the desired high permeability and low core loss. Furthermore, in some embodiments of the invention Tin (Sn) may replace Antimony (Sb) or be used in combination with Antimony, to achieve the desired magnetic properties. The composition of Sn may be less than or equal to 0.1% weight. In other embodiments of the invention various combinations of the elements in Table 1, as well as other elements (e.g., Sn, etc.), may be used to produce electrical steels with the desired magnetic properties without the need for the intermediate annealing step directly after cold rolling and before customer annealing. For example, in some embodiments only the silicon, aluminum, and manganese alloys are controlled and/or added to the molten steel. In still other embodiments of the invention only the silicon is controlled and/or added, and thus, the other elements are not controlled and/or added outside of any unavoidable impurities. In the embodiments presented herein the compositions may have one or more other elements that are present as unavoidable impurities with the remainder of the compositions comprising iron. In still other embodiments of the invention the composition of electrical steels may include ranges between, overlapping, or outside of two or more specific recitations of element percentages described herein (e.g., 0.15%, 0.4%, 0.6%, 1.05%, 1.35%, 2.2%, 2.24%, 2.6%, 3.0%, 3.5%, or the like of Si).

TABLE 1

Range of Elements for Desired Electrical Steel Permeability and Core Loss Properties

| Element | Composition (by weight percent) |
| --- | --- |
| Silicon (Si) | 0.15-3.5% |
| Aluminum (Al) | <=1% (or 0.15-1%) |
| Manganese (Mn) | 0.005-1% |
| Carbon (C) | <=0.04% (or <=0.02%) |
| Antimony (Sb) | <=0.1% |

The amount of silicon used in the electrical steel controls many aspects of the magnetic properties of the electrical steel. Silicon may be added to electrical steels to raise the resistivity of the material and concurrently reduce the eddy current loss component of the core loss. Alternatively, the lower the silicon level the higher the permeability and the higher the saturation. Thus, there is also a benefit to reducing the silicon in order to increase the permeability and allow the electrical steel to more easily support a magnetic field (e.g., at high magnitude inductions). Furthermore, the purer the electrical steel the higher the saturation level, and thus, the more magnetic induction can occur.

In the present invention the removal of the annealing step after cold rolling results in a minor degradation in core loss (e.g., core loss increases a small amount), but the permeability is much higher than electrical steels processed using traditional methods (e.g., as tested above 1.3 Tesla, 1.4

Tesla, 1.5 Tesla, or more than 1.5 Tesla, or outside of these Tesla ranges for example at 1.0 Tesla for thinner steels used in high frequency applications). The small degradation in core loss can be recovered by increasing the level of silicon, such that the final product produced using the process in the present invention can have the same or better core loss and much better permeability than electrical steels produced using the traditional processes that incorporate an intermediate annealing step after cold rolling and before stamping and annealing at the customer.

The processing conditions may also have an impact on the magnetic properties of the electrical steel. The ranges of conditions for processing the electrical steel in the present invention may vary based on the composition of the steels and/or magnetic properties desired. Examples of the ranges of processing temperatures are provided in Table 2A.

TABLE 2A

Conditions for Producing the Electrical Steels with the Desired Permeability and Core Loss

| Process Step | Temperature Range |
| --- | --- |
| Tunnel Furnace Exit Temperature | 1800 to 2300 Degrees F. |
| Hot Rolling Finish Temperature | 1450 to 1800 Degrees F. |
| Coiling Temperature | 900 to 1500 Degrees F. |
| Batch Anneal Soak Temp (in lieu of Continuous Anneal) | 1000 to 1900 Degrees F. (or 2100 Deg F.) |
| Continuous Anneal Temp (in lieu of Batch Anneal) | 1400 to 2000 Degrees F. (or 2100 Deg F.) |
| Cold Rolling Temperature | Ambient, or greater (May need > 100 F. for Si > 2.0%) |
| Customer Anneal | 1400 to 1675 F., or greater, for 45 min. to 1 hour |

Table 2B illustrates temperature ranges, which are narrower than the ranges described in Table 2A, in accordance with other embodiments of the processing conditions for manufacturing the electrical steels with the magnetic properties described herein. In still other embodiments of the invention the ranges of conditions for processing the electrical steels in the present invention may be a combination of the ranges described in Tables 2A and 2B, within the ranges described in Tables 2A and 2B, overlapping the ranges described in Tables 2A and 2B, or outside of the ranges described in Tables 2A and 2B.

TABLE 2B

Conditions for Producing the Electrical Steels with the Desired Permeability and Core Loss

| Process Step | Temperature Range |
| --- | --- |
| Tunnel Furnace Exit Temperature | 1800 to 2150 Degrees F. |
| Hot Rolling Finish Temperature | 1500 to 1700 Degrees F. |
| Coiling Temperature | 950 to 1450 Degrees F. |
| Batch Anneal Soak Temp (in lieu of Continuous Anneal) | 1000 to 1550 Degrees F. (or to 1900 Deg F.) |
| Continuous Anneal Temp (in lieu of Batch Anneal) | 1550 to 1900 Degrees F. |
| Cold Rolling Temperature | Ambient, or greater (May need > 100 F. for Si > 2.0%) |
| Customer Anneal | 1450 to 1550 F., or greater, for 45 min. to 1 hour |

For the higher levels of silicon content (e.g., greater than or equal to 2.2%, 2.6%, and/or 3.0%) the pre-annealing step between hot rolling and cold rolling may have to occur at the higher end of the listed temperature ranges. For example, the annealing temperature may be required to be at or above 1450, 1500, 1550, 1600, 1650, 1700, 1750, 1800, 1850, 1900, 1950, 2000, 2050, or 2100 degrees F. The annealing temperature range may be within, overlapping, or outside of any of these annealing temperatures. These temperatures for annealing may be needed to achieve the desired grain sizes in the steel. These annealing temperatures may also be used at the lower silicon levels if needed.

The core loss is also a function of the thickness of the electrical steel sheet. After hot rolling, the electrical steel sheet may have a thickness between 0.060" to 0.120." After cold rolling, the electrical steel sheet may have a thickness between 0.005" to 0.035." The thinner the final thickness of the steel sheet the lower the core loss and the better the efficiency of the electrical steel (e.g., with other parameters being equal). In other embodiments of the invention, the thickness of the electrical steel sheet after hot rolling and cold rolling may be within, overlap, or be outside of these ranges.

The following examples illustrate the improved magnetic properties that may be achieved using the present invention. As a first example, electrical steel of the composition illustrated in Table 3 was processed using the traditional process versus the process of the present invention according to the processing temperatures illustrated in Table 4 (e.g., there may be other process steps in addition to the steps illustrated in Table 4, for example in the traditional process a tempering rolling step may occur after batch annealing). The resulting electrical properties of the electrical steels are contrasted in Table 5. As disclosed in Table 3, the electrical steels tested in this example had a silicon composition of 1.35% weight.

TABLE 3

Composition of Electrical Steel Tested - 1.35% Si Sample

| Element | Composition (by weight percent) |
| --- | --- |
| Silicon | 1.35% |
| Aluminum | 0.33% |
| Manganese | 0.65% |
| Carbon | 0.005% |
| Antimony | 0.065% |

TABLE 4

Conditions for Producing The Electrical Steel - 1.35% Si Sample

| Process Step | Temperature | Product Thickness |
| --- | --- | --- |
| Tunnel Furnace Exit Temperature | 2000 Degrees F. | 2.0" |
| Hot Rolling Finish Temperature | 1550 Degrees F. | 0.080" |
| Coiling Temperature | 1000 Degrees F. | 0.080" |
| Batch Anneal Soak Temperature | 1530 Degrees F. | 0.080" |
| Cold Rolling Temperature | Ambient | 0.0197" |
| Batch Anneal Soak Temperature (For Traditional Process ONLY) | 1240 Degrees F. | 0.0197" |
| Customer Anneal | 1450 Degrees F. for one hour at 55 Degrees F. Dewpoint | 0.0197" |

TABLE 5

Electrical Steel Properties - 1.35% Si Sample

| Properties | New Process (1 Sample in 4 areas) | Traditional Process (10 Samples in various areas) |
| --- | --- | --- |
| Core Loss | 1.99-2.05 W/lb | 1.81-1.93 W/lb |
| Permeability | 3180-3429 Gauss/Oersted | 1716-1944 Gauss/Oersted |

Table 5 provides the ranges of core loss and permeability for electrical steels produced using the process of the present invention versus electrical steels produced using the traditional process that utilizes an annealing step after cold rolling and before customer annealing. All of the electrical steels tested in Table 5 had the same compositions, as illustrated in Table 3, were produced using the conditions illustrated in Table 4 (e.g., new process or traditional process), and were tested at the universal standard of 1.5 Tesla @ 60 Hz. Table 5 illustrates that the core loss using the new process only slightly increased to 1.99-2.05 W/lb from 1.81-1.93 W/lb using the traditional process, while the permeability using the new process greatly increased to a range of 3180-3429 G/Oe from 1716-1944 G/Oe using the traditional process. As illustrated by Table 5, the electrical steels produced using the new process have magnetic properties with a slightly increased core loss and much better permeability than the electrical steels produced using the traditional processing methods.

By increasing the silicon level in the composition and using the new processing method of the present invention, electrical steels may be produced that have the same or lower core loss and higher permeability while removing the need for an intermediate annealing step directly after cold rolling, as explained in further detail below with respect to Tables 6, 7, and 8.

As a second example, Table 8 provides the ranges of core loss and permeability for electrical steels produced using the process of the present invention versus electrical steels produced using the traditional process that utilizes an intermediate annealing step after cold rolling. The electrical steels tested had the same compositions, as illustrated in Table 6, were produced using the conditions illustrated in Table 7 (with the exception of the customer annealing temperature), and were tested at the universal standard of 1.5 Tesla @ 60 Hz. Table 8 illustrates that the core loss using the new process only slightly increased to 1.58-1.63 W/lb from 1.50-1.54 W/lb using the traditional process, while the permeability using the new process greatly increased to a range of 2379-2655 G/Oe from 1259-1318 Ga/Oe using the traditional process. As illustrated by Table 8, the electrical steels produced using the new process have magnetic properties with a slightly increased core loss and much better permeability than the electrical steels produced using the traditional processing methods as explained below.

TABLE 6

Composition of Electrical Steel Tested - 2.24% Si Sample

| Element | Composition (by weight percent) |
|---|---|
| Silicon | 2.24% |
| Aluminum | 0.41% |
| Manganese | 0.35% |
| Carbon | 0.005% |
| Antimony | 0.066% |

TABLE 7

Conditions for Producing The Electrical Steel - 2.24% Si Sample

| Process Step | Temperature | Product Thickness |
|---|---|---|
| Tunnel Furnace Exit Temperature | 2000 Degrees F. | 2.0" |
| Hot Rolling Finish Temperature | 1550 Degrees F. | 0.080" |
| Coiling Temperature | 1000 Degrees F. | 0.080" |
| Batch Anneal Soak Temperature | 1530 Degrees F. | 0.080" |
| Cold Rolling Temperature | Ambient | New process = 0.0193-0.0197"<br>Traditional Process ≈ 0.0187" |
| Batch Anneal Soak Temperature (For Traditional Process ONLY) | 1240 Degrees F. | New process = 0.0193-0.0197"<br>Traditional Process ≈ 0.0187" |
| Customer Anneal | 1550 Degrees F. for the new process (1450 Degrees for the traditional process) for one hour at 55 Degrees F. Dewpoint | New process = 0.0193-0.0197"<br>Traditional Process ≈ 0.0187" |

TABLE 8

Electrical Steel Properties

| Properties | New Process (1 Sample at head and tail) | Traditional Process (1 Sample at head and tail) |
|---|---|---|
| Core Loss | 1.58-1.63 W/lb | 1.50-1.54 W/lb |
| Permeability | 2379-2655 Gauss/Oersted | 1259-1318 Gauss/Oersted |

As disclosed in Table 6, the electrical steel produced had a silicon composition of 2.24% weight, which was an increase of 0.89% weight over the composition tested in Table 3. Furthermore, the composition of Aluminum in the steel increased from 0.33% weight to 0.41% weight, the composition of Manganese decreased from 0.65% weight to 0.35% weight, while the composition of Carbon and Antimony did not change or had only minor differences between the steel tested in Table 3 and the steel tested in Table 6.

Table 7 illustrates the process conditions for producing the electrical steel with the 2.24% Silicon weight composition. As illustrated in Table 7, the process conditions are the same as previously described with respect to Table 4 except for the increase in the customer annealing temperature from 1450 degrees F. using the traditional process to 1550 degrees F. for the new process without the intermediate annealing step after cold rolling. As explained in further detail later, the increase in the customer annealing temperature may also play a role in improving the magnetic properties of the electrical steel (e.g., reducing the core loss and/or improving the permeability). There is also a minor difference in the samples tested for the 2.24% Silicon steel using the new process and the sample tested for the 2.24% Silicon steel using the traditional process, in that the steel tested in the new process is slightly thicker than the steel tested using the traditional process. The small differences in thickness may have a small effect on the magnetic properties of the electrical steel. However, small changes in thicknesses may also occur over the span of a steel sheet itself, and thus, may only negligibly affect the magnetic properties of the steel. In addition, small differences in core loss, permeability, or other magnetic or material properties may be a function of the hot rolling parameters. For example, the head of the coil and the tail of the coil may experience different hot rolling parameters (e.g., small differences in temperature, pressure, or the like). For example, as illustrated in Table 8 the thickness differences between the head and tail or differences in the hot rolling parameters may affect the core loss and permeability, such that core loss and permeability at the head may be 1.58 w/lb and 2379, while the core loss and permeability at the tail may be 1.63 w/lb and 2655.

As was the case with the first example, illustrated in Tables 3-5, in the second example, as illustrated in Tables 6-8, the electrical steels produced using the new process have magnetic properties with a slightly increased core loss and much better permeability than the electrical steels produced using the traditional processing methods.

As described throughout the specification, in order to improve the magnetic properties of the steel over the traditional processing methods, steel may be produced using the new process without an intermediate step of annealing after cold rolling and before the optional steps of tension leveling and coating or temper rolling, as well as before the customer annealing step.

As illustrated by the examples set forth herein, by removing the intermediate annealing step after cold rolling (e.g., a final cold rolling pass) and increasing the amount of silicon in the steel, the present invention has improved upon the magnetic properties found in the electrical steels processed in the traditional way using an intermediate annealing step after cold rolling and before the customer annealing step. This point is illustrated in a comparison of Table 5 and Table 8, which illustrates that by using the new processing method and increasing the Silicon composition from 1.35% weight to 2.24% weight, improved magnetic properties can be achieved that result in both improved core loss (illustrated as a reduction in core loss from the range of 1.81-1.93 W/lb to the range of 1.58-1.63 W/lb) and improved permeability (illustrated as an increase in permeability from the range of 1716-1944 Gauss/Oersted to the range of 2379-2655 Gauss/Oersted).

Table 9 further illustrates the changes in core loss and permeability as the Silicon content of a steel increases and as the customer annealing temperature increases. As explained herein, core loss generally improves (illustrated as a decrease in core loss) as Silicon content increases, except when reaching the higher end the in the Silicon range (0.15-3.5%). As illustrated in Table 9, when the Silicon content reaches levels of approximately 2.6% to 3.5% the core loss may generally degrade (illustrated as an increase in core loss). The effects of the degraded core loss at the elevated Silicon levels may be mitigated or reversed by increasing the customer annealing temperature. As illustrated in Table 9, as the customer annealing temperature is raised from 1450 degrees F. to 1550 degrees F. (or higher) the core loss improves (illustrated as a decrease in core loss) across the ranges of Silicon from 2.2%-3.0%, such that the core loss only has slight variations with the changing Silicon levels at the higher annealing temperatures. Furthermore, core loss may be improved across the entire range of Silicon content when the customer annealing temperature increases, however, this benefit may be more noticeable as the level of Silicon increases. In some embodiments of the invention the annealing temperature may be increased up to 1600 degrees F. or 1700 degrees F., or more as described throughout this specification, in order to improve the core loss (illustrated as a decrease in value of the core loss). The carbon content of the steels may also play a role in the magnetic properties. The 2.6% and 3.0% Silicon steels illustrated in Table 9 had slightly higher carbon levels than the 2.2% Silicon steel, and as such the core loss measurements were relatively the same or slightly increased over the 2.2% Silicon steel core loss. If the carbon content in the 2.6% and the 3.0% Silicon steels were the same as the 2.2% Silicon steel the core loss in the 2.6% Silicon steel may have been reduced when compared to the 2.2% Silicon steel, and the core loss in the 3.0% Silicon steel may have been reduced when compared to the 2.2% Silicon steel and the 2.6% Silicon steel.

TABLE 9

| | Si Content vs. Properties vs. Intermediate Batch Annealing Temperatures For 0.0198" Thickness | | | |
|---|---|---|---|---|
| Si | 1450 F. Customer Annealing | | 1550 F. Customer Annealing | |
| Content | Core Loss | Permeability | Core Loss | Permeability |
| 2.2% | 1.79 W/lb | 2436 G/Oe | 1.61-1.67 W/lb | 2328-2645 G/Oe |
| 2.6% | 1.69-1.71 W/lb | 2215-2308 G/Oe | 1.62-1.63 W/lb | 2175-2191 G/Oe |
| 3.0% | 1.71-1.81 W/lb | 1665-1733 G/Oe | 1.64-1.70 W/lb | 1592-1745 G/Oe |

The improvement to the core loss by increasing the customer annealing temperature is also present at various sheet thicknesses. Table 10 illustrates the changes in magnetic properties of a 2.2% Silicon steel having a thickness of 0.0147" between customer annealing processes taking place at 1470 degrees F. and at 1550 degrees F. As illustrated in Table 10, as the customer annealing temperature increases the core loss decreases. Moreover, additional improvements in core loss or permeability may be realized by further increasing the customer annealing temperature to greater than 1600, 1650, 1700, 1750, or the like degrees F., or more as described throughout this specification. Furthermore, this improvement may occur at other levels of Silicon content (e.g., Silicon from 0.15 to 3.5%). Moreover, a comparison of the 2.2% Silicon electrical steel of Table 9 and the 2.2% Silicon electrical steel of Table 10 illustrates that as the thickness of the electrical steel sheet is reduced the core loss is improved (e.g., it decreases), with a small degradation in the permeability (e.g., it decreases).

TABLE 10

Properties vs. Customer Annealing Temperatures
For Approximately 0.0147" Thickness

| Si Content | 1470 F. Customer Annealing | | 1550 F. Customer Annealing | |
| --- | --- | --- | --- | --- |
| | Core Loss | Permeability | Core Loss | Permeability |
| 2.2% | 1.525 W/lb | 2149 G/Oe | 1.380-1.396 W/lb | 2312-2343 G/Oe |

In still other embodiments of the invention improvements in core loss and permeability may be achieved as the Silicon content of a steel increases by increasing the annealing temperature between hot-rolling and cold-rolling. As explained herein, core loss generally improves (illustrated as decrease in core loss) as Silicon content increases, except potentially when reaching the higher end of the Silicon range (0.15-3.5%), for example, with a Silicon content of approximately 2.6% to 3.5%, the core loss may generally degrade (illustrated as an increase in core loss). The effects of the degraded core loss at the elevated Silicon levels may be mitigated or reversed by increasing the temperature of the annealing process between the hot-rolling and cold-rolling steps. For example, increasing the annealing temperature to greater than 1600, 1650, 1700, 1750 degrees F., or more, as described throughout this specification, improves the core loss. In some embodiments, batch annealing at our around 1700 degrees F. may be the most cost effective for a batch annealing process. As temperatures for the batch annealing process increase over 1700, 1750, 1800, or the like, the furnaces in which the batch annealing occurs may require more expensive materials in order to protect the furnace from the high temperatures. As such, the most cost effective temperature for batch annealing that produces the desired results herein may be 1600, 1650, 1700, 1725, 1750, 1775, or 1800 degrees F., or any temperature or range of temperatures that fall within or overlap these temperature values.

By controlling the processing times, processing temperatures, and steel compositions within the new process, electrical steels with the desired magnetic properties required by the customers are developed without the need for an intermediate annealing step after cold rolling and before the customer stamping and customer annealing process. Moreover, these improvements may also be achieved using a batch annealing process instead of a continuous annealing line, which would require a large capital investment (e.g., 150 million US dollars or more). Batch annealing furnaces are much less expensive than installing a continuous annealing line. In some embodiments of the invention it is also noted that adding a coating, as described herein, may further improve the permeability of the electrical steel.

Another difference between electrical steels produced using traditional processing methods and electrical steels produced without an intermediate annealing step directly after cold rolling is that in the present invention the electrical steels are harder. For example, in the present invention the Rb hardness, which is a standardize hardness measurement, of the electrical steel may generally be in the range of 90 to 100 (or in some embodiments outside of this range), or more specifically in the high 90's. Alternatively, the hardness of the electrical steels manufactured using the traditional method may be 50 to 80 Rb.

Based on a number of factors, including but not limited to the silicon content of the steel, the thickness of the steel sheet, the annealing temperatures, and the process of performing an annealing step between hot rolling and before cold rolling and forgoing an annealing step after the last cold rolling pass before the sheet is sent to the customer for further processing, the core losses and permeability may fall within a number of different ranges. In some embodiments of the invention the core loss may be below 3.5, 3.25, 3, 2.75, 2.50, 2.25, 2, 1.75, 1.5, 1.25, or 1 W/lb, may be within, overlapping, or outside of any ranges between these core loss values or other core loss values not specifically recited. In addition to these core loss values, the permeability may be greater than 1000, 1100, 1200, 1250, 1300, 1350, 1400, 1450, 1500, 1550, 1600, 1650, 1700, 1750, 1800, 1850, 1900, 1950, 2000, 2050, 2100, 2150, 2200, 2250, 2300, 2350, 2400, 2450, 2500, 2550, 2600, 2650, 2700, 2750, 2800, 2850, 2900, 2950, 3000, 3050, 3100, 3150, 3200, 3250, 3300, 3350, 3400, 3450, or 3500 G/Oe, may be within, overlapping, or outside of any ranges between these permeability values or other permeability values not specifically recited.

As illustrated by some of the testing results, a silicon content of up to 3.5% (or in other embodiments up to 3.0%) may result in permeability values that may exceed 1400, 1450, 1500, 1550, or 1600 G/Oe, or any other type of permeability values illustrated herein (e.g., when tested at 1.5 T and 60 Hz). At these levels of silicon (e.g., 3.5%, 3%, or the like) the core loss may be less than 2, 1.75, 1.50, 1.25, 1 W/lb or other like core loss values. In other embodiments of the invention, the permeability values and the core less values may be within, outside of, or overlap these values or other values discussed herein. Generally, as the silicon level drops the core loss and the permeability will both increase (e.g., the core loss is degraded and the permeability improves). This statement is applicable when all other factors remain unchanged because other factors such as the thickness of the steel sheets and the temperatures of the annealing steps may impact the core loss and permeability values. At the lower levels of silicon, for example 0.6%, the core loss may be less than 4.5, 4.0, 3.5, 3.0, 2.6, 2.5 W/lb, and the permeability may be greater than 2000, 2050, 2100, 2150, and 2200 G/Oe (or greater than other levels discussed herein) (e.g., when tested at 1.5 T and 60 Hz). In other embodiments of the invention the core loss and permeability values may fall within, be located outside of, or overlap any of these values.

Table 11 below illustrates additional testing that has occurred for various types of steel with various types of silicon formed from the processes of the present invention discussed herein. As illustrated in Table 11, the concepts that were previously discussed herein are further supported by the additional testing of steel sheets processed without a post cold-rolled anneal after the last cold-rolling step and before the steel is shipped to a customer for stamping and final annealing. For the 2.2% silicon content steel, Table 11 illustrates generally that as the customer annealing temperature is increased the core loss value decreases (e.g., is improved). Moreover, with respect to steel with the 2.6% silicon, Table 11 illustrates generally that as the customer annealing temperature is increased the core loss value decreases (e.g., is improved). Finally, with respect to the 3% silicon content steel, Table 11 also illustrates generally that as the customer annealing temperature is increased the core loss value decreases (e.g., is improved). Table 11 further indicates that as the customer annealing temperature changes the permeability fluctuates. The changes in permeability may be based not only on the changes in Silicon content, but also on the thickness, location on the steel sheet at which the permeability is tested, composition of the steel (e.g., carbon content, or other element), and/or other factors.

TABLE 11

Si Content vs. Thickness vs. Customer Annealing Temperature vs. Magnetic Properties

| Si Content | Thickness | Customer Annealing Temperature | Core Loss | Permeability |
|---|---|---|---|---|
| 2.2% | 0.0198" | 1450 Deg F. | 1.787 W/lb | 2436 G/Oe |
| 2.2% | 0.0184" | 1550 Deg F. | 1.67 W/lb | 2449 G/Oe |
| 2.2% | 0.0197" | 1550 Deg F. | 1.617 W/lb | 2328 G/Oe |
| 2.2% | 0.0197" | 1550 Deg F. | 1.667 W/lb | 2645 G/Oe |
| 2.2% | 0.01975" | 1550 Deg F. | 1.72 W/lb | 2232 G/Oe |
| 2.6% | 0.0196" | 1450 Deg F. | 1.694 W/lb | 2308 G/Oe |
| 2.6% | 0.0205" | 1450 Deg F. | 1.617 W/lb | 2175 G/Oe |
| 2.6% | 0.0199" | 1550 Deg F. | 1.628 W/lb | 2191 G/Oe |
| 2.6% | 0.0206" | 1550 Deg F. | 1.617 W/lb | 2175 G/Oe |
| 3% | 0.0206" | 1450 Deg F. | 1.711 W/lb | 1665 G/Oe |
| 3% | 0.0206" | 1450 Deg F. | 1.805 W/lb | 1733 G/Oe |
| 3% | 0.0206" | 1550 Deg F. | 1.642 W/lb | 1592 G/Oe |
| 3% | 0.0206" | 1550 Deg F. | 1.696 W/lb | 1745 G/Oe |

In other embodiments of the invention additional process steps may be added, or processing steps may be changed, in order to achieve the desired magnetic properties (e.g., core loss, permeability, or the like) of a steel sheet manufactured by performing an annealing step between hot rolling and cold-rolling without an annealing step after a final cold-rolling pass and before customer stamping and annealing. As described above, one embodiment of the present invention may comprise hot rolling, pickling, annealing (e.g., batch annealing or continuous annealing), cold rolling, and tension leveling and coating, or surface roughing or temper rolling and tension leveling. As such, there is no annealing step after the last cold rolling step and before the tension leveling and coating, or roughing or temper rolling and tension leveling, as well as before shipment to the customer for stamping and final annealing. In alternate embodiments of the invention described above, the cold rolling process may occur in multiple steps of two or more cold rolling passes through one or more cold rolling stands, which may further include annealing steps between the two or more cold rolling passes. Regardless of the number of cold rolling passes and annealing steps between the cold rolling passes, in the present invention there is no intermediate annealing step after the final cold rolling pass and before the tension leveling and coating, or roughing or temper rolling and tension leveling, as well as before the customer stamping and annealing.

As discussed above, the thicknesses of the steel sheets after cold rolling are described herein as ranging between 0.005" to 0.035." At the lower end of the range of the thickness of the steel sheets, such as from approximately 0.005 inches to 0.01, 0.0125, 0.015, 0.018, 0.02 inches (or other ranges that fall within, outside of, or overlap these ranges), multiple cold rolling passes may be needed with one or more annealing steps between the multiple cold rolling passes in order to achieve the desired mechanical properties at the lower end of the thickness ranges for the steel sheets. In other embodiments, multiple cold rolling steps may also be used up to thicknesses of 0.025", 0.031", and/or 0.035." In addition to the multiple cold rolling steps, in some embodiments the amount of silicon in the composition of the steel may also play a role in the thickness of the steel sheets, or otherwise determine how many cold rolling steps are needed. For example, depending on the equipment used during the rolling processes, the higher silicon content the harder it may be to achieve the thinner steel sheets. In just one example, when using steel with a silicon content that is approximately 3% (e.g., greater than 2.9 percent) it may be difficult to roll the steel strips to lower than 0.014, 0.013, 0.012, 0.011, or the like inches with one cold-rolling pass. As such, in some embodiments multiple cold-rolling steps may be needed to achieve the recited thickness ranges. In other embodiments, regardless of the number of cold rolling steps, thicknesses lower than the recited values, or other like values not specifically listed, may not be reached at all.

Table 12 illustrates a comparison of steels that are on the lower end of the thickness range and have the same compositions (e.g., 2.2% silicon), but are processed using different types of routings. The first routing process in Table 12 includes a batch anneal before cold rolling and a batch anneal at 1450 Deg F. after the final cold rolling step (e.g., single cold rolling step) before shipping to the customer for stamping and final annealing (e.g., defined as a motor lam semi-processed steel). The second routing process in Table 12 includes a batch anneal before cold rolling and a batch anneal at 1550 Deg F. after cold rolling step (e.g., single cold rolling step) before shipping to the customer for stamping and final annealing (e.g., also defined as a motor lam semi-processed steel). The final routing process illustrated in Table 12 does not include an annealing step after cold rolling and before customer stamping and customer final annealing (e.g., the new process of the present invention). As illustrated in Table 12 the steel of the present invention (e.g., the third routing) has approximately the same core loss (1.595 vs. 1.59 W/lb) as the steel produced from the traditional process that is customer annealed at 1550 Deg F., and has a better permeability (2240 vs. 1904 G/Oe). The present invention also has slightly worse core loss (1.595 vs. 1.265 W/lb) than steel produced from the traditional process that is customer annealed at 1450 Deg F., and a much better permeability (2240 vs. 1179 G/Oe). As such, in order to improve the core loss with only slightly losing some permeability, the silicon content of the steel in the present invention is increased. The increase in the silicon content allows the steel to achieve the same or better magnetic properties of the semi-processed motor lam steel without the annealing step after the last cold-rolling process.

TABLE 12

Routing Process vs. Thickness vs. Customer Annealing Temperature vs. Magnetic Properties

| Si Content | Routing Process | Thickness | Customer Anneal Temp | Core Loss | Perm. |
|---|---|---|---|---|---|
| 2.2% | 1) Hot rolling, Batch Annealing, Cold Rolling, Batch Annealing, Temper Rolling, Customer Stamping and Annealing | 0.0137" | 1450 Deg F. | 1.265 W/lb | 1179 G/Oe |
| 2.2% | 2) Hot Rolling, Batch Annealing, Cold Rolling, Batch Annealing, Customer Stamping and Annealing | 0.0137" | 1550 Deg F. | 1.59 W/lb | 1904 G/Oe |
| 2.2% | 3) Present Invention: Hot Rolling, Batch Annealing, Cold Rolling, Customer Stamping and Annealing | 0.0139" | 1550 Deg F. | 1.595 W/lb | 2240 G/Oe |

As previously discussed, it may be difficult to achieve the thicknesses illustrated in Table 12 for the higher levels of silicon (e.g., greater than 2.6%, such as 3%, or the like). In some embodiments of the present invention, as illustrated in FIG. 3, the steelmaking process may include the same steps as illustrated in FIGS. 1A and 1B with an additional cold rolling step and/or an additional annealing step between the cold rolling steps. As such, after melting, alloying, transferring to a ladle, casting into slabs, and heating the slabs or direct hot-rolling from casting (as illustrated in blocks 10-45), the slabs are hot rolled for one or more passes into sheets as illustrated by block 50 of FIG. 3. As illustrated by block 55, the hot-rolled sheets are pickled. An annealing step (e.g., batch annealing or continuous annealing) follows the hot rolling step and the pickling step, as illustrated by block 60. This annealing step, as previously discussed, may occur at a temperature within a range of 1000 to 1900 or 2100 Degrees F., or fall within, be outside of, or overlap these ranges. After annealing, the sheet is passed through a first cold rolling step (e.g., in one or more passes) as illustrated by block 71, in order to reduce the thickness of the sheet to a range of less than approximately 0.100," 0.090," 0.080" to 0.060", 0.050", 0.040" or 0.020" (or other ranges that fall within, are outside of, or overlap these ranges). As illustrated by block 72, an annealing step (e.g., batch annealing or continuous annealing) after the first cold-rolling pass may be performed in order to recover the ductility of the sheet, to reduce the dislocation density of the sheet for reducing residual stresses in the sheet, and to help achieve the desired electrical steel properties. The annealing step after the first cold rolling step may be performed at a temperature of 1000 to 1900 or 2100 Deg F., or fall within, be outside of, or overlap these ranges (as described throughout). After the intermediate annealing step after the first cold-rolling step, a subsequent (e.g., final, last, or the like) cold rolling step (e.g., in one or more passes) is performed to further reduce the thickness of the sheet to the desired thickness range of 0.005" to 0.018" or 0.02" (or other ranges that fall within, outside of, or overlap these ranges such as up to 0.025", 0.031", or 0.035"), as illustrated in block 73 of FIG. 3. In other embodiments of the invention there may be additional cold rolling passes (e.g., second, third, fourth, fifth, or more), each with intermediate annealing steps, before the final cold rolling step. However, in some embodiments there may only be two cold rolling steps (e.g., each with one or more passes) with a single annealing step between the two cold rolling steps. After the final (e.g., last) cold rolling step, further annealing of the steel sheet is not performed before the optional steps of roughing or temper rolling, tension leveling, and/or coating, as illustrated by blocks 75, 80, 90 of FIG. 3. Moreover, there is no annealing step after cold rolling and before the sheet is shipped to the customer for stamping and customer annealing, as illustrated by blocks 100, 110, and 120. As such, while there are one or more intermediate annealing steps between the multiple cold rolling passes there is no annealing step after the final cold rolling pass and before the semi-processed steel is sent to the customer for stamping and final annealing. Table 13 illustrates one embodiment of the process of the present invention using two cold rolling steps.

TABLE 13

Conditions for Producing the Electrical Steels with the Desired Permeability and Core Loss

| Process Step | Temperature Range |
|---|---|
| Tunnel Furnace Exit Temperature | 1800 to 2300 Degrees F. (or 1800 to 2150 Deg. F.) |
| Hot Rolling Finish Temperature | 1450 to 1800 Degrees F. (or 1500 to 1700 Deg. F.) |
| Coiling Temperature | 900 to 1500 Degrees F. (or 950 to 1450 Deg. F.) |
| Batch Anneal Soak Temp (in lieu of Continuous Anneal) | 1000 to 1900 Degrees F. (or 2100 Deg F.), or 1000 to 1550 Deg. F. (or 1900 Deg F.), or 1450 Deg. F. to 2100 Deg F. |
| Continuous Anneal Temp (in lieu of Batch Anneal) | 1400 to 2000 Degrees F. (or 2100 Deg F.), or 1550 to 1900 Deg. F. (or 2100 Deg F.) |
| First Cold Rolling Temperature | Ambient, or greater (May need > 100 F. for Si > 2.0%) |
| Batch Anneal Soak Temp (in lieu of Continuous Anneal) | 1000 to 1900 Degrees F. (or 2100 Deg F.), or 1000 to 1550 Deg. F. (or 1900 Deg F.), or 1450 Deg. F. to 2100 Deg F. |

TABLE 13-continued

Conditions for Producing the Electrical Steels
with the Desired Permeability and Core Loss

| Process Step | Temperature Range |
| --- | --- |
| Continuous Anneal Temp (in lieu of Batch Anneal) | 1400 to 2000 Degrees F. (or 2100 Deg F.), or 1550 to 1900 Deg. F. (or 2100 Deg F.) |
| Second Cold Rolling Temperature | Ambient, or greater (May need > 100 F. for Si > 2.0%) |
| Customer Anneal | 1400 to 1800 F. (or 1400 to 1675 F.), or greater, for 45 min. to 1 hour (or outside of this duration) |

The multiple cold rolling steps with an intermediate annealing step between the cold rolling steps allows for the desired magnetic properties for the thinner ranges of steel sheets (e.g., 0.005" to 0.018", 0.02" or the like), and particularly with respect to steel sheets with silicon levels greater than 2.6%, 2.7%, 2.8%, 2.9%, 3.0%, or the like. In one example, using a silicon steel of 3% and including an annealing step after hot rolling and before a first cold rolling step (e.g., one or more first cold rolling passes), an intermediate annealing step after the first cold rolling step, a final (e.g., second) cold rolling step (e.g., one or second cold rolling passes) and no additional intermediate annealing steps until stamping and customer annealing, a steel sheet with a thickness of approximately 0.015" may be achieved (see Table 14). Other thicknesses described herein may also be achieved, as described in other examples presented below. The magnetic properties achieved using this particular type of routing, silicon content (e.g., silicon content above 2.8%, such as 3% or other like silicon content described herein), and steel sheet thickness of less than 0.018", may include a core loss range of 0.80 w/lb to 1.6 w/lb (or to 1.8 w/lb) and a permeability range of 800 G/Oe to 2000 G/Oe (or to 2500 G/Oe) (e.g., measured at 1.5 Tesla), or core loss or permeability ranges that fall within, overlap, or fall outside of these stated ranges. Table 14 illustrates that using the higher silicon levels, thinner steel thicknesses (e.g., multiple cold rolling steps or the thin cast strip steel described below), and higher customer annealing temperatures, the present invention can achieve similar core losses and better permeability than the steels with the same, similar, or lower silicon content that were produced using an annealing step after cold rolling (see Table 12 routings 1 and 2).

TABLE 14

Si Content vs. Thickness vs. Customer Annealing
Temperature vs. Magnetic Properties

| Si Content | Thickness | Customer Annealing Temperature | Core Loss | Permeability |
| --- | --- | --- | --- | --- |
| 3% | 0.0178" | 1600 Deg F. | 1.48 W/lb | 2022 G/Oe |
| 3% | 0.0152" | 1600 Deg F. | 1.4 W/lb | 1849 G/Oe |
| 3% | 0.0152 | 1700 Deg F. | 1.38 W/lb | 1611 G/Oe |

In another embodiment of the invention, instead of, or in addition to, utilizing multiple cold rolling steps to produce steels at the lower end of the range of the thickness of the steel sheets (e.g., from approximately 0.005" to 0.015", 0.018", 0.02", 0.031", 0.035", or the like), the present invention may begin by utilizing thinner steel sheets at the beginning of the process. For example as described above, the thicknesses of the steel sheets after hot rolling are typically 0.060" to 0.120," which are produced from steel slabs that typically have thicknesses that range between 1.5" to 3" (or slabs that fall within, overlap, or are outside of this range). In some embodiments of the invention, instead of using steel slabs and hot rolling the steel slabs in one or more hot rolling passes to the desired thicknesses, continuously cast thin steel strips (e.g., thin strip cast steel) may be utilized in order to begin the process of the present invention with a thinner steel sheet.

In one embodiment of the invention, as illustrated in FIG. 4, the process may begin with manufacturing or purchasing (e.g., from another manufacturer) thin strip cast steel, as illustrated by block 12. Thin strip cast steel may be manufactured by a process that includes melting scrap steel in an EAF and tapping the EAF so that the molten metal flows into a ladle. Ladle treatments may be performed, such as applying components for alloying the steel to the desired composition, achieving the desired temperature for the molten metal, or the like. The ladle is positioned over a tundish and the molten metal is transferred to the tundish. The tundish is drained into a water cooled mold that is used to solidify the molten metal. In the mold a thin shell of metal is solidified near the walls of the mold while steel in the middle of the mold remains molten. As the metal exits the mold the metal has a hard shell with a molten interior, at this point the metal is called a strand. The strand is then passed through multiple pairs of water-cooled rollers, which support and cool the strand as the molten metal within the interior of the strand solidifies. The strand may also pass through a cooling chamber that sprays cooling liquid, such as water, on the strand to help further solidify the core of the strand. The strand may pass through various rolling operations to straighten, smooth, reduce the thickness, or the like of the strand and form a coil. In some embodiments of the invention the thin strip cast steel produced by the continuous casting process may have a thickness less than or equal to 0.035", 0.065", 0.1 or other thickness described herein. In one embodiment of the invention, the thickness of the thin strip cast steel may have a thickness that is less than or equal to 0.04" 0.05", 0.06", 0.07", 0.08", 0.09", 0.10", 0.11", 0.12", 0.15, or 0.2". In other embodiments of the invention the ranges of the thicknesses of the thin strip cast steel may be within, overlap, or fall outside of these values.

The present invention may include utilizing the continuous casting process to produce, or otherwise purchase, steel coils with a thickness less than 0.15", 0.125", 0.1", 0.8", 0.065", or 0.04" (or other like thickness whether or not specifically discussed herein). In the present invention, the process may utilize the thin strip cast steel in order to avoid the need for hot rolling a slab and performing multiple cold rolling steps to manufacture steel sheets with the desired thicknesses. In some embodiments of the invention since the thickness of the continuously cast steel sheet is less than 0.1", 0.065", or 0.04" (or other like thickness discussed herein) the steel sheet is thin enough to roll into a thickness between 0.005" to 0.015", 0.018", 0.02", 0.031", 0.035", or the like, in a single cold rolling pass. Therefore, in some embodiments of the present invention the process for manufacturing steel sheets with the desired magnetic properties would include procuring (e.g., manufacturing or obtaining) a continuously cast steel sheet with a thickness equal to or less than 0.1" (or other thickness described herein), as illustrated by block 12 of FIG. 4. As illustrated by block 55, the thin strip cast steel sheet may be optionally pickled. An annealing step (e.g., batch annealing or continuously annealing) is performed on the cast steel sheet, as illustrated by block 60 of FIG. 4. For example, in one embodiment of the invention the annealing step is a high temperature annealing step, such as annealing at a temperature of 1550 degrees F. (or within a range of 1000 to 2100 degrees F.). In one embodiment of the invention, after annealing only a single cold rolling step (e.g., with one or more cold rolling passes) is needed to produce the steel of the desired thickness between 0.005" to 0.015", 0.018", 0.020", 0.031", 0.035", or the like, as illustrated by block 70. In other embodiments of the invention, as previously discussed two or more cold rolling steps (e.g., each with one or more cold rolling passes) may be utilized with or without intra-annealing steps between the multiple cold rolling steps and/or passes. However, regardless of the number of cold rolling steps or passes there is no annealing step after the last cold rolling step and before the optional tension leveling and coating, or optional roughing or temper rolling and tension leveling, as illustrated by blocks 75, 80, 90 of FIG. 4. Moreover, there is no annealing step after cold rolling and before stamping and annealing at the customer, as illustrated by blocks, 100, 110, and 120 of FIG. 4.

The use of a thin strip cast steel product with a reduced thickness in the present invention allows for the desired magnetic properties for the thinner ranges of steel sheets (e.g., 0.005" to 0.010", 0.015", 0.018", 0.02", 0.031", or the like). The magnetic properties achieved using this particular type of routing may include a core loss range of 0.80 w/lb to 1.25 w/lb (or to 1.6 w/lb, 1.8 w/lb, or more) and a permeability range of 800 G/Oe to 1500 G/Oe (or to 2500 G/Oe) (e.g., measured at 1.5 Tesla), or core loss or permeability ranges that fall within, overlap, or fall outside of these stated ranges, as discussed throughout this specification.

In one example embodiment of the invention two rolled samples of the electrical steel discussed herein were produced for high frequency applications, in which steel was produced having a composition of 2.90% wt Si; 0.62% wt Al; and 0.28% Mn. In some embodiments, in order to achieve the desired properties at the thinner steel thicknesses the composition of particular elements previously described herein are controlled to tighter ranges, as illustrated in Table 15.

TABLE 15

Range of Elements for Desired Electrical Steel Permeability and Core Loss Properties at Thicknesses less than 0.015 inches

| Element | Composition (by weight percent) | Specific Composition of Samples (by weight percent) |
|---|---|---|
| Silicon (Si) | 2.8-3.5% | 2.9% |
| Aluminum (Al) | 0.5-0.75% | 0.62% |
| Manganese (Mn) | 0.2-0.4% | 0.28% |

The steel in the example embodiment was produced by hot rolling a 2-inch slab down to a steel sheet with a thickness of 0.073 inches in multiple hot rolling passes (e.g., in 6 hot-rolling passes). Thereafter, the steel sheet with the 0.073 inch thickness after hot rolling was pickled to remove scale from the steel sheet surface. After pickling, the steel sheet was coiled and batch annealed at a temperature of 1700 degrees F. After batch annealing the steel sheet was cold rolled to a post first cold rolled thickness of 0.036 inches in one or more cold rolling steps (e.g., one cold rolling pass). Thereafter, the steel sheet with a 0.036 inch post first cold roll thickness was batch annealed again at a temperature of 1550 degrees F.

The steel sheet was then split into two separate steel rolls, one of which was cold rolled to a post second (or final) cold rolled thickness of 0.0118 inches in one or more cold rolling passes (e.g., 6 passes), while the other roll was rolled to a post second (or final) cold rolled thickness of 0.008 inches in one or more cold rolling passes (e.g., greater than 6 cold rolling passes). At these thicknesses, the steel sheets may need a very smooth surface to achieve the desired electrical and mechanical properties in the final applications (e.g., after customer stamping and final customer annealing), as such, the steels may be produced with a surface roughness that is less than 15, 14, 13, 12, 11, 10, 9, 8, 7, 6, or 5 microns, or the like. The samples produced herein had an average surface roughness of 6 microns. The steel coils were tension leveled after the second (or final) cold rolling step in order to flatten the edges of the steel sheets. In some embodiment, it is at this point that the steel coils may be coated, however, the examples produced herein were not coated. At this point in the process the steel coils would be sent to the customer without an annealing step after the second (or final) cold rolling step, for the customer stamping step and customer final annealing step after stamping in order to create the desired products. To simulate this process samples were taken from the steel coils and annealed. With respect to the steel samples having a thickness of 0.0118 inches the samples were annealed at 1550 degrees F. at 55 F dewpoint in a Hydrogen/Nitrogen (HNx) atmosphere. The steel samples having a thickness of 0.008 inches were annealed at 1600 degrees F. at 55 dewpoint in the HNx atmosphere. The samples were then tested over various frequencies as illustrated below in Table 16. We note that the samples discussed in Tables 16-18 are illustrated as having a core loss measured using the units of w/kg instead of the w/lbs previously discussed herein. The unit changes is used in order to compare the samples made in the present invention with products that are on the market that utilize the traditional process that includes an annealing step after final cold rolling (e.g., using a continuous annealing line) and before the products are shipped to the customer for stamping and final customer annealing. However, we again, further note that the core loss and permeability values discussed herein, are the values that would be achieved after the final customer annealing.

TABLE 16

Core Loss and Permeability of 0.0118 and 0.008 Steel Sheet Thicknesses Measured at the Head (H) and Tail (T) of the Coil

| Location | | H | T | H | T | H | T | H | T | H | T | H | T | H | T |
|---|---|---|---|---|---|---|---|---|---|---|---|---|---|---|---|
| Thickness | Units | 50 Hz @ 1.5T | 50 Hz @ 1.5T | 60 Hz @ 1.5 T | 60 Hz @ 1.5 T | 200 Hz @ 1.0 T | 200 Hz @ 1.0T | 400 Hz @ 1.0 T | 400 Hz @ 1.0 T | 600 Hz @ 1.0 T | 600 Hz @ 1.0 T | 800 Hz @ 1.0 T | 800 Hz @ 1.0 T | 1000 Hz @ 1.0 T | 1000 Hz @ 1.0 T |
| .0116" | w/kg | 2.31 | 2.31 | 2.87 | 2.86 | 5.78 | | 15.4 | 15.32 | 28.73 | 27.5 | 44.44 | 42.75 | 65.04 | 64.33 |
| | G/Oe | 1610 | 1744 | 1603 | 1745 | 9861 | | 7986 | 8137 | 6347 | 6712 | 5391 | 5676 | 4626 | 4683 |
| .008" | w/kg | 2.51 | | 3.06 | | 5.5 | | 12.30 | 12.01 | | | | | 45.45 | 44.28 |
| | G/Oe | 1578 | | 1570 | | 8844 | | 9054 | 9674 | | | | | 6919 | 7181 |
| B50 | Tesla | 1.69 | 1.69 | | | | | | | | | | | | |

The samples described with respect to Table 16 were compared against similar products on the market that were made utilizing an annealing step after the final cold rolling process and utilizing a continuous annealing process instead of batch annealing. Table 17 illustrates the comparisons of products on the market that utilize annealing after final cold rolling before stamping and customer annealing at various test points and the samples of the present invention for steels of approximately 0.0118 inches. Table 18 illustrates the comparisons of products on the market that utilize annealing after final cold rolling before stamping and customer annealing at various test points and the samples of the present invention for steels of approximately 0.008 inches.

TABLE 17

Comparison of 0.0118 inch Steels of the Present Invention with Products on the Market that Utilize Annealing after the Final Cold Rolling Step

| Comparison Product | Test | Products With Annealing after Final Cold Rolling | 0.0118 Thickness Products of the present invention | Present Invention Improvement |
|---|---|---|---|---|
| 1 (0.0118 inch thickness) | 1.0 T w/kg @400 Hz | 16.0 | 15.35 | Improvement |
| | B50 Perm | 1.62 | 1.69 | Improvement |
| 2 (0.0118 inch thickness) | 1.0 T w/kg @400 Hz | 14.5 | 15.35 | |
| | B50 Perm | 1.66 | 1.69 | Improvement |
| 3 (0.0118 inch thickness) | 1.0 T w/kg @400 Hz | 15.0 | 15.35 | |
| | B50 Perm | 1.60 | 1.69 | Improvement |
| 4 (0.0118 inch thickness) | 1.0 T w/kg @400 Hz | 15.0 | 15.35 | |
| 5 (0.0118 inch thickness) | 1.0 T w/kg @400 Hz | 15.0 | 15.35 | |
| | B50 Perm | 1.60 | 1.69 | Improvement |
| 6 (0.0118 inch thickness) | 1.0 T w/kg @400 Hz | 16.0 | 15.35 | Improvement |
| | B50 Perm | 1.64 | 1.69 | Improvement |

TABLE 18

Comparison of 0.008 inch Steels of the Present Invention with Products on the Market that Utilize Annealing after the Final Cold Rolling Step

| Comparison Product | Test | Products With Annealing after Final Cold Rolling | 0.008 Thickness Products of the present invention | Present Invention Improvement |
|---|---|---|---|---|
| 1 (0.007 inch thickness) | 0.9 T w/kg @ 400 Hz | 13.2 | 10.2 | Improvement |
| | 1.0 T Perm | 5982 | 9814 | Improvement |
| 2 (0.010 inch thickness) | 1.0 T w/kg @ 400 Hz | 12.8 | 12.5 | Improvement |
| | B50 Perm | 1.63 | 1.69 | Improvement |
| 3 (0.008 inch thickness) | 1.0 T w/kg @ 400 Hz | 11.9 | 12.5 | |
| | B50 Perm | 1.64 | 1.69 | Improvement |
| 4 (0.008 inch thickness) | 1.0 T w/kg @ 400 Hz | 12.7 | 12.5 | Improvement |
| | B50 Perm | 1.67 | 1.69 | Improvement |
| 5 (0.008 inch thickness) | 1.0 T w/kg @ 400 Hz | 12.2 | 12.5 | |
| | 1.0 T Perm | 8035 | 9814 | Improvement |
| 6 (0.008 inch thickness) | 1.0 T w/kg @ 400 Hz | 12.9 | 12.5 | Improvement |
| | 1.0 T Perm | 7955 | 9814 | Improvement |

Based on a number of factors, including but not limited to the silicon content of the steel, the thickness of the steel sheet, the annealing temperatures, and the process of performing an annealing step between hot rolling and before cold rolling and forgoing an annealing step after the last cold rolling pass before the sheet is sent to the customer for further processing, the core losses and permeability may fall within a number of different ranges for steels of the present invention which have thicknesses that are less than 0.02, 0.018, 0.015, 0.012, 0.01, 0.008, or the like. In some embodiments of the invention the core loss measured at 1.0 T at 400 Hz may be below 20.0, 19.0, 18.0, 17.0, 16.0, 15.5, 15.0, 14.5, 14.0, 13.5, 13.0, 12.5, 12.0, 11.5, 11.0, 10.5, 10.0, or the like w/kg, may be within, overlapping, or outside of any ranges between these core loss values or other core loss values not specifically recited. In addition to these core loss values, the permeability measured at 1.0 T at 400 Hz may be greater than 4000, 4500, 5000, 5500, 6000, 6500, 7000, 7500, 8000, 8500, 9000, or 9500 G/Oe, may be within, overlapping, or outside of any ranges between these permeability values or other permeability values not specifically recited. In addition to the permeability measured at 1.0 T at 400 Hz, the B50 Perm measurement may be greater than 1.55, 1.56, 1.57, 1.58, 1.59, 1.60, 1.61, 1.62, 1.63, 1.64, 1.65, 1.66, 1.67, 1.68, 1.69, 1.70, 1.71, 1.72, 1.73, 1.74, 1.75, or the like Tesla, may be within, overlapping, or outside of any ranges between these B50 measurement values or other values not specifically recited.

Another feature of the electrical steel of the present invention is that in addition to the improved core loss and permeability properties, the electrical steel has improved mechanical properties. Table 19 below illustrates the improved mechanical properties both before and after customer annealing of the steel of the present invention (e.g., steel manufactured from a process that includes an annealing step between hot rolling and cold rolling, and after customer stamping, but not between the last cold rolling step and the customer annealing step). As illustrated in Table 19, before the customer annealing step the yield strength and the ultimate tensile strength of the electrical steels made from the new process of the present invention are almost twice as high as the electrical steels made from the traditional process. Moreover, after the customer annealing step the mechanical properties of the electrical steels made from the new process are similar to, or are an improvement over, the mechanical properties of the electrical steels made from the traditional process.

Table 19 also illustrates that the hardness of the electrical steels made from the new process are higher than the electrical steels made from the traditional process both before and after customer annealing. In addition, Table 19 illustrates the elongation percent (El %) value for the steels, which is a measurement of the ductility of the steel. In some embodiments of the invention, lower El percentages may be desired because it may be easier to stamp parts from steels with lower El percentages.

TABLE 19

Mechanical Properties of Electrical Steels of the New Process vs. Traditional Process

| Routing | Steel Product Type (Si wt %) | Before Customer Anneal | | | | After Customer Anneal | | | |
| --- | --- | --- | --- | --- | --- | --- | --- | --- | --- |
| | | YS (ksi) | UTS (ksi) | EI (%) | Hardness (Rb) | YS (ksi) | UTS (ksi) | EI (%) | Hardness (Rb) |
| Traditional | Si 0.25% | 56.6 | 62.3 | 20.8 | 68 | 16.9 | 43.4 | 32.7 | 58 |
| Traditional | Si 0.4% | 56.9 | 66.9 | 33.3 | 70 | 21.0 | 45.9 | 33.3 | 46 |
| Traditional | Si 1.05% | 61.0 | 72.3 | 15.1 | 73 | 29.1 | 51.9 | 30.8 | 69 |
| New | Si 1.05% | 129.4 | 130.1 | 1.1 | 98 | 35.6 | 58.6 | 24.2 | 71 |
| Traditional | Si 1.35% | 66.1 | 75.5 | 13.5 | 70 | 33.5 | 53.6 | 26.6 | 64 |
| Traditional | Si 2.2% | 72.9 | 87.4 | 14.4 | 80 | 47.3 | 58.1 | 16.2 | 68 |
| New | Si 2.2% | 138.1 | 141.7 | 1.1 | 99 | 46.1 | 64.3 | 17.8 | 75 |

Table 19 illustrates a single test result for particular types of steel. It should be understood that the mechanical properties achieved in the present invention may fall within various ranges. For example, the Silicon 1.05 wt % steel may have the following property ranges before customer annealing: YS—100 to 160 ksi; UTS—100 to 160 ksi; EI of 0.5 to 2; and Hardness of 90 to 110; and after customer annealing: YS—25 to 45 ksi; UTS—40 to 80 ksi; EI of 15 to 35; and Hardness of 60 to 80. In another example, the Silicon 2.2 wt % steel may have the following property ranges before customer annealing: YS—110 to 170 ksi; UTS—110 to 170 ksi; EI of 0.5 to 2; and Hardness of 90 to 110; and after customer annealing: YS—35 to 55 ksi; UTS—45 to 85 ksi; EI of 10 to 25; and Hardness of 65 to 85. In other embodiments of the invention the ranges may fall within, overlap, or fall outside of these stated ranges.

For steels with higher silicon levels (e.g., above 2.2% Si) the mechanical properties of steels manufactured using the new process may also be improved over the mechanical properties of steels manufactured using the traditional process. For example, for steels with silicon contents of 2.6%, 3.0%, or more, the hardness of the steels may be greater than 80, 85, 90, 95, or 100 Rb. Moreover, the mechanical properties of YS, UTS, and El may be greater than the values (or ranges) described with respect to Table 19.

The electrical steels of the present invention described herein may be utilized for various electric motor applications. For example, the electrical steels from the present invention may be utilized for applications in which higher strength electrical steels are needed, applications in which higher frequencies are required, or the like.

In some applications electric motors have a stationary stator that has windings or permanent magnets that surround a core comprising layers of electrical steel sheets. The rotor is located within the stator and has conductors that carry currents that interact with the magnetic field of the stator for driving a shaft attached to the rotor. In other applications electric motors may have rotors that are coupled to the permanent magnets instead of the stator, while the stator includes the conductors. The electrical steels of the present invention can be used in both applications, but in one embodiment of the invention the electrical steels may be particularly useful in electric motors in which the rotor has the permanent magnets and the stator has the conductors. In this embodiment, electrical steels made from the traditional process described herein (e.g., having an annealing step after cold rolling and before customer stamping and annealing) may be used to create the stator portion of the electrical steel, but not the rotor portion. For example, when permanent magnets are used on the rotor itself, the rotor is not magnetized because the magnets create the magnetic field. As such, in these applications the polarity of the stator is changed to rotate the rotor within the stator. In order to improve the efficiency of the motor for rotating at higher levels of rotations per minute (RPM) and higher levels of torque, the rotor strength has to be improved. As such, high strength steel can be used for the rotor to result in higher levels of RPM and torque for the electric motor. When customers use electrical steels made from the traditional process described herein, the electrical steel sheets are annealing after cold rolling, then the electrical steel is shipped to the customer for stamping and customer annealing to achieve the desired magnetic properties. The stator and rotor parts are stamped out of the electrical steel sheets in a single stamping process. However, the rotor parts made from the electrical steels produced from the traditional process do not have the required strength to meet the desired motor applications which require higher levels of RPMs and torque. As such, the rotor parts cannot be used and are scraped or used for other applications. Instead, the rotor parts are made from steel products that have higher strengths and the permanent magnets are coupled to the rotors made from the higher strength material. Alternatively, the stamped stator parts are customer annealed to achieve the desired magnetic properties. This situation creates waste within the manufacturing process and increases the costs of the electric motors (e.g., additional stamping process costs, additional high strength steel material costs, and the like).

Alternatively, the electrical steels of the present invention (e.g., which do not include an annealing step after cold rolling and before customer stamping and customer annealing) have a higher strength before stamping and customer annealing (see Table 19). As such, the electrical steels of the present invention may be stamped by the customer to create the rotor and stator parts. The stator parts may then be annealed by the customer to achieve the desired magnetic properties, while the rotor parts stamped from the same electrical steel sheet may be utilized without the customer annealing step or annealed at a lower customer annealing temperature to preserve the higher strength of the steel (see Table 19). By annealing at lower customer annealing temperatures the rotor parts may retain some of the mechanical properties (e.g., better than the stator) while the core loss and permeability would still be improved (e.g., not as good as the stator), but the costs could be reduced due to increased productivity and the lower annealing temperature (e.g., don't have to anneal as long and can save electricity that is usually required to reach higher temperature annealing). The present invention allows the customer to stamp the stator and rotor parts from the same sheet of metal without having to replace the stamped rotor parts with parts stamped from higher strength steels. In the traditional process by annealing the electrical steel sheet after the final cold rolling step and before shipping to the customer for stamping and final annealing the desired magnetic properties may be achieved, but the strength of the electrical steel sheet is sacrificed.

Another application of the electrical steels of the present invention may include applications (e.g., motors, or the like) that require higher operating frequencies. For example, some electric motors may only require frequencies of around 60 Hz (e.g., the alternating current switches from + to − at a rate of 60 times per second), or other like frequencies. However, other electric motors, such as electric motors used in cars may be required to operate at approximately 400 Hz, 500 Hz, 600 Hz, 700 Hz, 800 Hz, 900 Hz, 1000 Hz, or higher (or any ranges that fall within, overlap, or are outside of these ranges). For example, in some applications steels with silicon values greater than 2.2 wt % and with thicknesses less than or equal to 0.02 inches (or less than or equal to 0.014") may be particularly useful in motor applications with high frequencies. In order to achieve the desired properties at these higher frequency levels the size of the grains in the electrical steel sheets are kept to smaller grain sizes. When a cycle occurs within the electrical steel, the domains of the grain flip back and forth between two different orientations. As such, the domains of the grains are aligned in a first direction and are flipped into a second direction and back to the first direction for each cycle. The larger the grain size the larger the domain of the grain, which requires more energy to reach the higher frequencies because of the larger area that has to be covered in a shorter amount of time. At lower frequencies, larger grain sizes are not an issue because the amount of energy needed to flip the domain is not restrictive. However, at higher frequencies (e.g., 400 Hertz or more as described above) it is harder to flip the domain fast enough to reach frequencies of 400 Hz or higher, and as such, it takes more energy to flip the domain when the size of the grains are larger. The additional energy required to achieve the higher frequency levels increases the heat loss and reduces the efficiency of the electric motor. As such, smaller grain sizes are more efficient at higher frequencies. The process of the present invention can produce electrical steels with smaller grain sizes than the grain sizes of the electrical steels produced by the traditional process (as described above). In addition to the smaller gain sizes, the present invention still achieves the same, similar, or improved magnetic properties (e.g., core loss, permeability, or the like) and mechanical properties as can be achieved using the traditional process (as described above).

It should be understood that when discussing the magnetic properties of the electrical steel, the magnetic properties of the electrical steel are based on the composition of the electrical steel, the processing of the semi-processed electrical steel sheet, and the customer stamping and final customer anneal occurring at the customer. The final magnetic properties of the steel are provided after processing at the customer, and may or may not be dependent on the shape of the stamped part made from the electrical sheet steel sent to the customer.

Moreover, it should be understood that the lower limit of any of the components discussed herein may be 0.0005, 0.001, 0.005, 0.01, or the like.

While certain exemplary embodiments have been described herein, and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method of manufacturing an electrical steel, the method comprising:
   hot rolling a steel slab in one or more hot rolling passes into a steel sheet;
   annealing the steel sheet after the hot rolling, wherein the annealing after the hot rolling is a batch annealing process, and wherein the annealing after the hot rolling is performed at a post hot rolling annealing temperature that is greater than or equal to 1550 degrees Fahrenheit; and
   cold rolling the steel sheet in one or more cold rolling passes after the annealing after the hot rolling;
   wherein the steel sheet is stamped into a stamped part and annealed after stamping without an intermediate annealing process after the cold rolling and before the stamping and the annealing after the stamping, and
   wherein when the annealing after the stamping is performed at a post stamping annealing temperature that is greater than or equal to 1550 degrees Fahrenheit the stamped part comprises:
      silicon (Si) in a range of 2.0-2.6% weight;
      aluminum (Al) in a range of 0.15-1% weight;
      manganese (Mn) in a range of 0.005-1% weight;
      carbon (C) less than or equal to 0.04% weight; and
      antimony (Sb) or tin (Sn) less than or equal to 0.1% weight;
      wherein a remainder of a composition of the stamped part comprises unavoidable impurities and iron; and
      wherein the stamped part has a permeability greater than or equal to 2000 G/Oe and a core loss less than or equal to 1.8 W/lb after the annealing after the stamping in all directions in the stamped part.

2. The method of claim 1, further comprising:
   performing one or more of a tension leveling, a coating, or a rough rolling process on the steel sheet after the cold rolling and before the stamping and the annealing after the stamping.

3. The method of claim 1, wherein grain size of the stamped part ranges from 20 to 70 microns.

4. The method of claim 1, further comprising pickling the steel sheet after the hot rolling and before the annealing after the hot rolling.

5. The method of claim 1, further comprising:
   sending the steel sheet to a customer for the stamping and the annealing after the stamping.

6. The method of claim 1, wherein the post hot rolling annealing temperature is greater than or equal to 1700 degrees Fahrenheit.

7. The method of claim 1, wherein the post stamping annealing temperature is greater than or equal to 1700 degrees Fahrenheit.

8. A method of manufacturing an electrical steel, the method comprising:
   hot rolling a steel slab in one or more hot rolling passes into a steel sheet;
   annealing the steel sheet after the hot rolling, wherein the annealing after the hot rolling is a batch annealing process, and wherein the annealing after the hot rolling is performed at a post hot rolling annealing temperature that is greater than or equal to 1550 degrees Fahrenheit; and
   cold rolling the steel sheet in one or more cold rolling passes after the annealing after the hot rolling;
   wherein the steel sheet is stamped into a stamped part and annealed after stamping without an intermediate annealing process after the cold rolling and before the stamping and the annealing after the stamping; and
   wherein when the annealing after the stamping is performed at a post stamping annealing temperature that is greater than or equal to 1550 degrees Fahrenheit the stamped part comprises;
      silicon (Si) in a range of 2.0-3.5% weight;
      aluminum (Al) in a range of 0.15-1% weight;
      manganese (Mn) in a range of 0.005-1% weight;
      carbon (C) less than or equal to 0.04% weight;
      antimony (Sb) or tin (Sn) less than or equal to 0.1% weight; and
      wherein a remainder of a composition of the stamped part comprises unavoidable impurities and iron; and
      wherein the stamped part has a permeability greater than or equal to 1400 G/Oe and a core loss less than or equal to 1.8 W/lb after the annealing after the stamping in all directions in the stamped part.

9. The method of claim 8, further comprising:
   performing one or more of a tension leveling, a coating, or a rough rolling process on the steel sheet after the cold rolling and before the stamping and the annealing after stamping.

10. The method of claim 8, further comprising pickling the steel sheet after the hot rolling and before the annealing after the hot rolling.

11. The method of claim 8, further comprising:
   sending the steel sheet to a customer for the stamping and the annealing after the stamping.

12. The method of claim 8, wherein the post hot rolling annealing temperature is greater than or equal to 1700 degrees Fahrenheit.

13. The method of claim 8, wherein the post stamping annealing temperature is greater than or equal to 1700 degrees Fahrenheit.

14. The method of claim 8, wherein grain size of the stamped part ranges from 20 to 70 microns.

15. The method of claim 8, wherein the Si is in a range of 2.0-2.6% weight.

16. The method of claim 8, wherein the Si is in a range of 2.6-3.5% weight.

* * * * *